United States Patent [19]
Artsy

[11] Patent Number: 5,701,484
[45] Date of Patent: Dec. 23, 1997

[54] ROUTING OBJECTS ON ACTION PATHS IN A DISTRIBUTED COMPUTING SYSTEM

[75] Inventor: Yeshayahu Artsy, Nashua, N.H.

[73] Assignee: Digital Equipment Corporation, Maynard, Mass.

[21] Appl. No.: 26,624

[22] Filed: Mar. 4, 1993

Related U.S. Application Data

[63] Continuation of Ser. No. 525,970, May 18, 1990, abandoned.

[51] Int. Cl.[6] .............................. G06F 13/00; G06F 15/21; G06F 15/56
[52] U.S. Cl. ............... 395/683; 395/200.03; 395/200.15; 395/200.16; 358/402
[58] Field of Search .................. 364/DIG. 1, DIG. 2; 395/683, 200.03, 200.15, 200.16; 358/402

[56] References Cited

U.S. PATENT DOCUMENTS

| | | | |
|---|---|---|---|
| 4,503,499 | 3/1985 | Mason et al | 364/200 |
| 4,648,061 | 3/1987 | Foster | 364/900 |
| 4,820,167 | 4/1989 | Nobles et al. | 434/336 |
| 4,885,684 | 12/1989 | Hustin et al. | 364/300 |
| 4,932,026 | 6/1990 | Dev et al. | 370/94.1 |
| 4,962,532 | 10/1990 | Kasiraj et al. | 380/25 |
| 5,040,141 | 8/1991 | Yazima et al. | 364/900 |
| 5,040,142 | 8/1991 | Mori et al. | 364/900 |
| 5,051,891 | 9/1991 | MacPhail | 395/600 |
| 5,125,075 | 6/1992 | Goodale et al. | 395/200 |

OTHER PUBLICATIONS

Peter H. Lewis, "Listen Closely: Your Files May Be Talking to You," The New York Times, Sunday, Mar. 25, 1990, p. 8F.
Distribution List Generator, IBM Technical Disclosure Bulletin, vol. 29 No. 9 Feb. 1987 pp. 3831–3832.
Martin, "Complete Logical Routings in Computer Mail Systems,"ACM Transaction on Office Information Systems, Jan. 1986, pp. 64–80.
Mazer et al, "Logical Routing Specification in Office Information Systems,"ACM Tran. on Office Information systems, Oct. 1981, pp. 303–330.
Wolfson et al, "Intelligent Routers,"Proc. of 9th Int'l Conf. on Distributed Computing Systems, Jun. 1989, pp. 371–376.
Woo et al, "Supporting Distributed Office Problem Solving in Organizations,"ACM Trans. on Office Automation Concepts and Tools, ed. D.C. Tsichritzis, Springer–Verlag, Berlin, 1985.
Hogg, "Intelligent Massage Systems," (Chapter 6) pp. 113–133, in Office Automation Concepts and Tools, ed. D.C. Tsichritzis, Springer–Verlag, Berlin, 1985.
Tsichritzis et al, "A system for managing structured messages", IEEE Trans, on Communications COM–30:1 (Jan. 1982), pp. 66–73.

Primary Examiner—Lucien U. Toplu
Attorney, Agent, or Firm—John G. Graham; Arthur W. Fisher; A. Sidney Johnston

[57] ABSTRACT

A system for routing an "object" (in the sense that object means an abstraction that encapsulates data in a known way, with a known list of operations or methods to access the data, and the object has a unique identity, is mobile, and possibly persistent). The "object" is routed in a distributed computing system along an action path (itself an "object") which defines the logical path to be traversed by the object. The action path consists of action stops naming or describing functionally principals (people or automated mechanisms) required to act upon the routed object in a prescribed order. The object routing system propagates the object along this action path, and monitors and controls its progress until it completes the path. The system includes mechanisms of dispatching the routed object between principals, finding the principals required to act on the routed object, notifying the principals in turn of their required action, and potentially relocating the routed object to the nodes of the principals. Optionally, the object routing system may use mechanisms for nagging principals about pending actions (if no progress occurs within a specified period), reporting such lack of action or progress to other principals, supporting the sharing of an action path by multiple routed objects, and facilitating the routing of an object in parallel to multiple principals. This object routing system is constructed as a generic service layer above services for object management, migration, persistence and interobject communication.

19 Claims, 12 Drawing Sheets

(FLOW CHART A DISPATCH)

LEGEND:

* IF CURRENT AS IS SET OF PARALLEL STOPS THIS DEPENDS ON THE PARALLELISM INDICATORS OR PAR_IN FUNCTION.

** IF CURRENT AS IS A SET OF PARALLEL STOPS, PERFORM THIS FOR EACH STOP IN A SET (ACCORDING TO PARALLISM INDICATORS OR PAR_OUT FUNCTION)

(FLOW CHART A1)

(FLOW CHART D
DELIVERY)

(FLOW CHART A2 PERFORM ACTION PATH TRAILER)

Fig. 10 (FLOW CHART A3 PERFORM NOTIFICATION AND DELIVERY)

(FLOW CHART B FUNCTIONAL TRANSLATION)

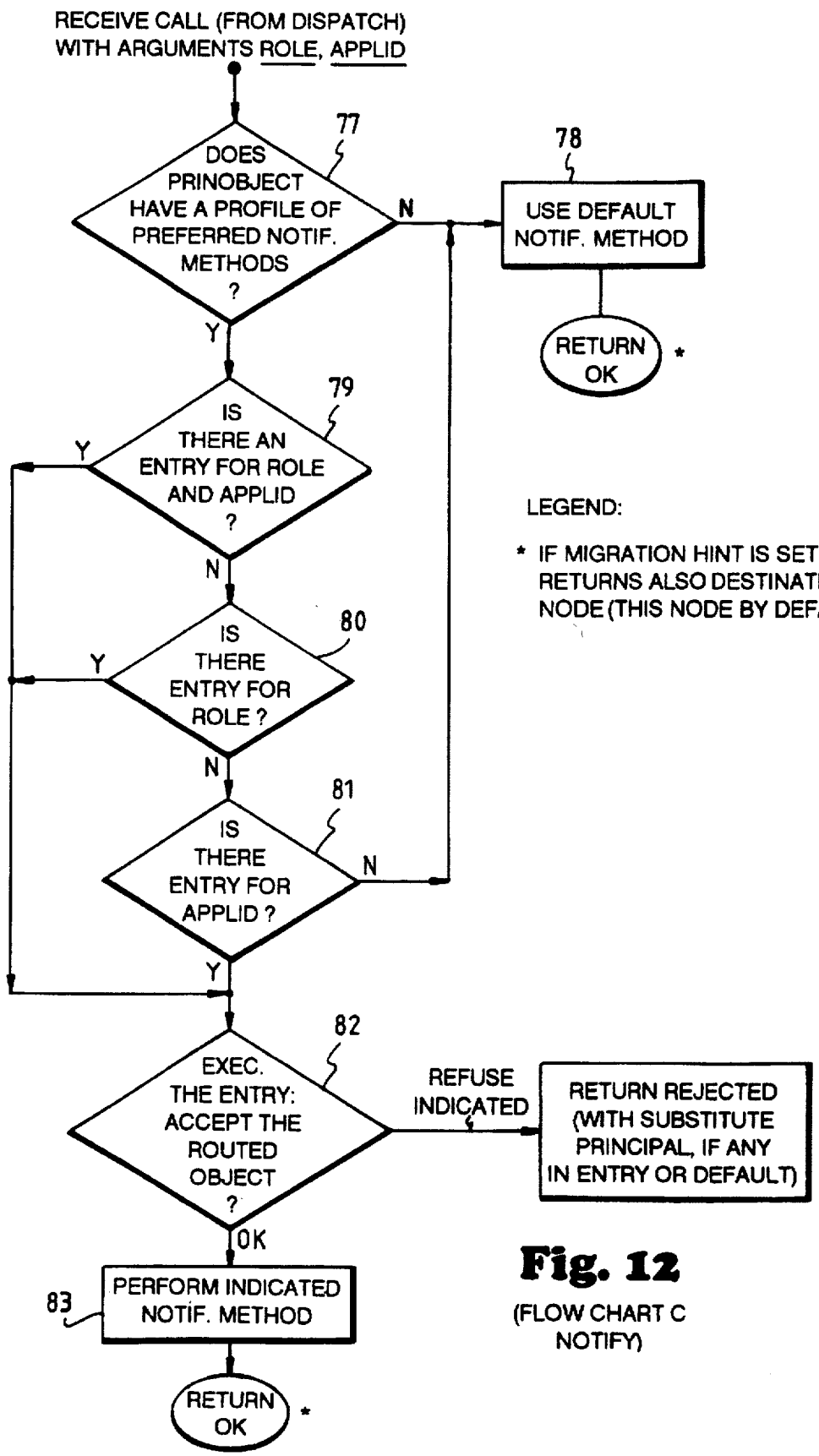

(FLOW CHART E ALERT)

LEGEND:

* IF CURRENT ACTION STOP IS A SET, THESE ACTIONS ARE REPEATED FOR EACH MEMBER IN THE SET, AND THE RETURN IS ONLY ONCE WHEN ENTIRE SET IS HANDLED.

(FLOW CHART F DISPATCH)

ROUTING OBJECTS ON ACTION PATHS IN A DISTRIBUTED COMPUTING SYSTEM

RELATED APPLICATIONS

This application is a continuation of Ser. No. 07/525,970 filed May 18, 1990, abandoned.

BACKGROUND OF THE INVENTION

This invention relates to distributed computing systems, and more particularly to a method of routing objects along action paths in such systems.

The advent of communications networks for connecting computer systems has enabled the composition of large distributed computer systems by connecting together dispersed stations such as offices, plants, and points of sale. These stations can exchange mail messages, data and state information. Distributed system services and tools (i.e., software running on nodes in a distributed system) such as remote procedure call (RPC), name service, and distributed database, have been developed that enable the construction of truly distributed applications that may span hundreds or thousands of nodes across the country or the globe. In many of these distributed applications, it has become desirable to be able to transfer control and data between users, each of whom has to perform certain actions on the data; examples of such applications include, for example, (1) office applications that transfer forms, memos or folders to specified functionaries (usually persons) for review or approval, (2) medical applications that circulate patients' medical records or lab tests among specified hospitals, clinics and laboratories for evaluation, (3) network management systems that exchange status reports among various system managers, or (4) applications in manufacturing that circulate purchase orders, production plans, and run cards among control centers, production plants, or sales offices. These distributed applications would automate processes that heretofore had relied upon passing physical objects (e.g., paper forms, expense statements, run cards, "travelers", etc.) between specified stations. Each such physical object, or its counterpart in a distributed computing system, has a defined logical path to traverse, which lists the functionaries (usually persons, defined by organization and role) to act on the object, and possibly the required actions: sign, update, or read the object and pass it on. The path is translated to people names and locations, and the object is physically transferred from location to location.

These distributed applications lend themselves to an object-oriented approach, in which objects represent the physical entities such as business forms, medical records, and manufacturing run cards. An object has a unique identifier, it exists as a whole at a node of the distributed system, it can migrate between nodes, and it can be persistent. In the automated applications, objects would logically (and perhaps physically) move between nodes, asking the required functionaries to act on them. As will be described, to support this object-oriented service, an action path is specified for the object, and mechanisms are provided to propagate the object along the path and to monitor and control its progress; these mechanisms are called the object routing system, according to the invention. The action path specifies which principals (representing other functionaries in the computing system) have to act on the object and in which order, and perhaps additional information such as whether to physically move the routed object to the node of the next principal.

An example of logical routing of objects in a distributed system is that of routing of forms in a large business organization. One employee fills in a form, and the routing application (program) assigns it an action path. The form moves logically to the employee's manager for approval, then perhaps to some additional managers, then to a controller (which may be an automated program), and finally to the (computerized) corporate archive. The action path may indicate additional actions that the system should perform before the object starts its route and similarly after it finishes the route.

Several features are appropriate in such an object routing system. First, a mechanism for dispatching objects between principals, which will be responsible for finding the principals given their functional description (such as organization role, or name), notifying each of them in turn, and delivering the object to them. Secondly, a means is needed to specify exceptions and alert principals to handle them. Additionally, principals may need to be reminded if no action occurs within a predefined, application-specific period, and others may want to be informed as the object proceeds along the path. Finally, the object routing system should allow for parallel routing, and for simultaneous sharing of an action path by multiple routed objects, where sharing and parallelism are desirable.

Object routing as herein discussed is not the same as prior systems of message routing in communications networks and of work flow control in manufacturing or similar applications. Unlike message routing, object routing is not concerned with choosing the most efficient set of links to transfer a message (or object in this case) from one point in a distributed system to another one, but is rather concerned with the orderly propagation of an object between logical stations. Unlike workflow control, object routing does not specify the actions to be performed at each station, nor schedules these actions—instead these actions are left to the application or the object itself.

Previously, systems and application software have been developed for the task of logical routing of entities between nodes of a distributed computing system. These have been mainly concerned with routing mail messages or documents in office automation environments. For example, Tsichritzis et al in "A System for Managing Structured Messages", IEEE Trans. on Communications COM-30:1 (January 1982), pp. 66–73, describes a system for integrating the facilities of mail message systems and database management systems; the system is structured as a logical star, with one control node and multiple satellite nodes, and each station maintains a "station database" to register message identifiers and hold copies of message contents. Messages are structured, have unique identifiers, and are stored in a mailbox database at the control node. Users can retrieve messages remotely, check the path of a message in transit, and change the path, which allows message traceability to some extent. However, the system architecture restricts its scalability (i.e., the ability to be extended to large systems without degradation of performance or increase of complexity), reliability (in case of crash of the control node), and the ability of multiple objects to share a path.

An elaborate routing system designed for a message management system (MMS) is described by M. S. Mazer et al, "Logical routing specification in office information systems," ACM Trans. on Office Information Systems 2:4 (October 1984), pp. 303–330. This routing system defines a programming language and provides a compiler to specify logical paths, supports type routing (based upon message type), instance routing (based on specification at message creation time), and ad-hoc and manual routing (for exceptions). The path is dynamically updated based upon message content, conditions set by users, or exceptions raised by them. The design also supports shared and parallel routing, using a logically centrallized database to store the messages and their paths. Additional features include specifying timeouts for each recipient, sending alerts to recipients, and the use of a role network to retrieve names from functional descriptions. This design, however, does not address persistance (not a design goal). Its method of path evaluation and extension is application-dependent, geared toward mail systems. This system is difficult to adopt to a generic routing service. The system relies on a database for message (and path) consistency and traceability, and this reliance may constrain the scalability of MMS to large distributed systems.

An "intelligent mail" (Imail) system is described by J. Hogg, "Intelligent message systems (Ch. 6)," pp. 113–133 in Office Automation Concepts and Tools, ed. D.C. Tsichritzis, Springer-Verlag, Berlin, 1985. The Imail system views imessages as active objects that circulate among users. A script specifies a possible path together with the required actions; users at each station are asked a set of questions, and the path is dynamically evaluated, or modified based upon their answers and the message's state. In this system, there is no support for explicitly defined action paths that can be automatically controlled by the routing system, and no facility is provided for reminding users of pending actions. To support path sharing and parallel routing, the system requires multiple copies of a message, and uses a rather complex mechanism to synchronize their changes, which restricts its scalability.

An object-oriented model for distributed processing of work in an office automated system is described by C. C. Woo et al, "Supporting distributed office problem solving in organization," ACM Trans. on Office Information Systems 4:3 (July 1986), pp. 185–204. The route of a given object is not explicitly specified, but rather is a by-product of processing the object. It is dynamically derived by the cooperation of a task object (which specifies the agenda of the given object), a task monitor object (the counterpoint of a policy maker), and consultation rules (the policy). The resultant path is expressed in application-specific conditions, the routing service is tightly coupled with the application, and the model does not address issues of path sharing and parallel routing.

A routing system which supports object migration in a heterogeneous environment is described by C. D. Wolfson et al, "Intelligent Routers," Proc. of the Ninth Int'l Conf. on Distributed Computing Systems, IEEE Computer Society, June 1989, pp. 371–376. As in the Woo et al model, the path is implicitly derived during execution, and can be neither changed nor examined explicitly. By the nature of the system, objects cannot be routed in parallel or share action paths with other objects, and the system does not provide reminding and exception handling services.

SUMMARY OF THE INVENTION

In accordance with one embodiment of the invention, a system is provided for routing an "object" (in the sense that object means an abstraction that encapsulates data in a known way, with a known list of operations or methods to access the data, and the object has a unique identity, is mobile, and possibly persistent). The "object" is routed in a distributed computing system along an action path (itself an "object") which defines the logical path to be traversed by the object. The action path consists of action stops naming principals (people or automated mechanisms) required to act upon the routed object in a prescribed order. The object routing system propagates the object along this action path, and monitors and controls its progress until it completes the path. The system includes mechanisms of dispatching the routed object between action stops, finding the principals required to act on the routed object (based upon functional information), notifying the principals in turn of their required action, and potentially relocating the routed object to the nodes of the principals. This object routing system is constructed as a generic service layer above services for object management, migration, persistence and interobject communication.

An important feature of an alternative embodiment of the invention is the optional addition of a reminding or "nagging" mechanism. The object routing system may use mechanisms for nagging principals about pending actions (if no progress occurs within a specified period), and/or reporting such lack of action or progress to other principals.

Another important feature of the object routing system according to one embodiment is that of supporting the sharing of an action path by multiple principals, and facilitating the routing of an object in parallel to multiple principals.

The object routing system of this invention differs fundamentally from prior work in the field as described above in that this is a generic, application-independent distributed systems service, supporting parallel and shared routing, lets principals choose how to be notified when their action is required, lets them ask to be reminded on certain events or nag others regarding pending actions, and, if necessary, "physically" moves the object between nodes. The routing method is suitable for small systems or highly distributed systems consisting of hundreds or thousands of nodes.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 12 is a more detailed logic flow chart of the step of notify in the method of FIG. 6;

DETAILED DESCRIPTION OF SPECIFIC EMBODIMENTS

Figure 1:
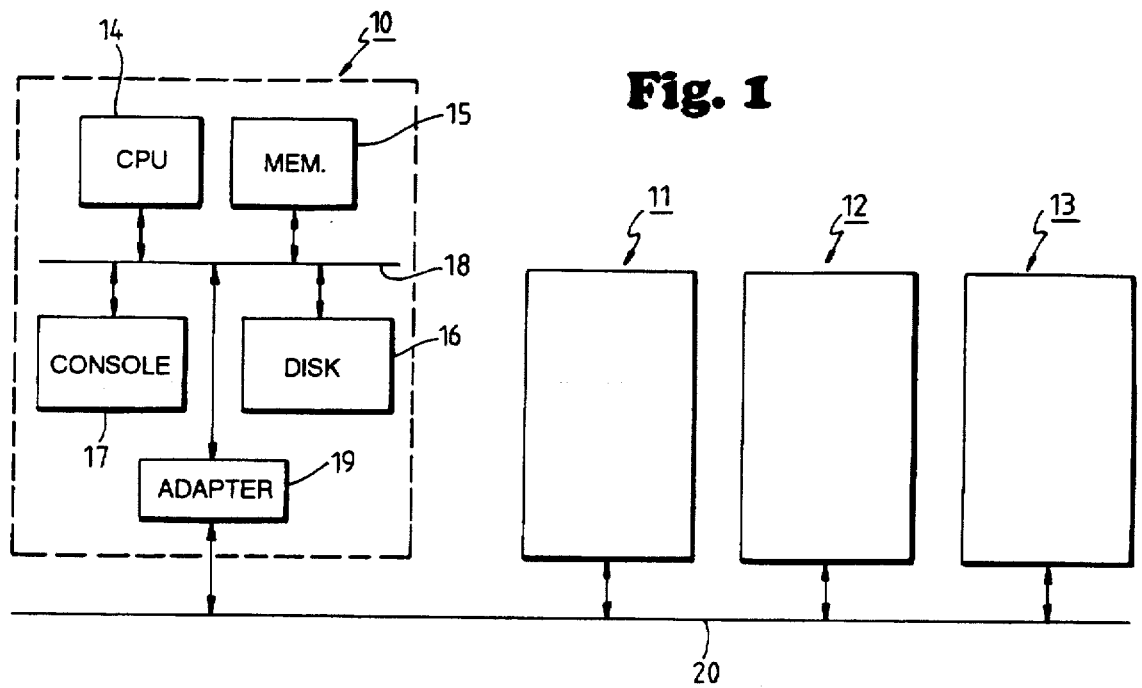
FIG. 1 is a diagram in block form of a distributed computer system with several physical nodes 10–13 which may employ a object routing system in accordance with one embodiment of the invention.

Referring to FIG. 1, a distributed computer system is shown which includes a number of physical nodes 10, 11, 12 and 13, where each node is typically a workstation having a CPU 14 and a memory 15, and which may also have a hard disk storage unit 16 and a console (keyboard and display) 17, all interconnected by a system bus 18. A communications adapter 19 is used to connect each node by a link 20 to all of the other nodes. Although four are shown, there are typically hundreds or thousands of the nodes 10-13, and the link 20 may include local area networks of the DECnet, token ring, StarLAN or Ethernet type, for example, as well as fiber optic links (FDDI) and satellite links, or a combination of these using bridge nodes, all of which, in turn, may be part of a wide area network. The nodes 10-13 are illustrated as workstations having CPUs executing code from a memory, but of course a node may be another type of resource such as merely a disk store or like device which includes some mechanism such as a state machine for implementing the logical processes to be described. Usually the CPU of each one of the nodes 10-13 in the example of FIG. 1 is executing its own copy of an operating system (e.g., Unix or DOS) to create a logical node, but also a number of the nodes might be executed on a single CPU, such as where individual users have terminals connected to the bus of a central computer executing a multiuser operating system such as Unix. The location of the nodes 10-13 and their communication mechanism are transparent to the object routing system, which deals with object invocations using object handles, as will be described.

Because the physical nodes 10-13 of FIG. 1 may be separated by large distances, and the objects to be acted upon in the method of the invention usually require some type of interaction between a user at one of the nodes and the data structure in an object, it is therefore desirable that the object be local, i.e., at the node 10-13 which is presently the one acting on the object. If the distance between nodes is large, it is not acceptable to maintain the object at one node and have it acted upon by the other necessary nodes through the network link 20, because the response time would become unduly long and the burden on the communications link 20 would become excessive. Of course, if all the nodes which are to invoke an object are close to one another, the object need not move from one to another, but the capability of moving (migrating) must be available if needed.

Figure 2:
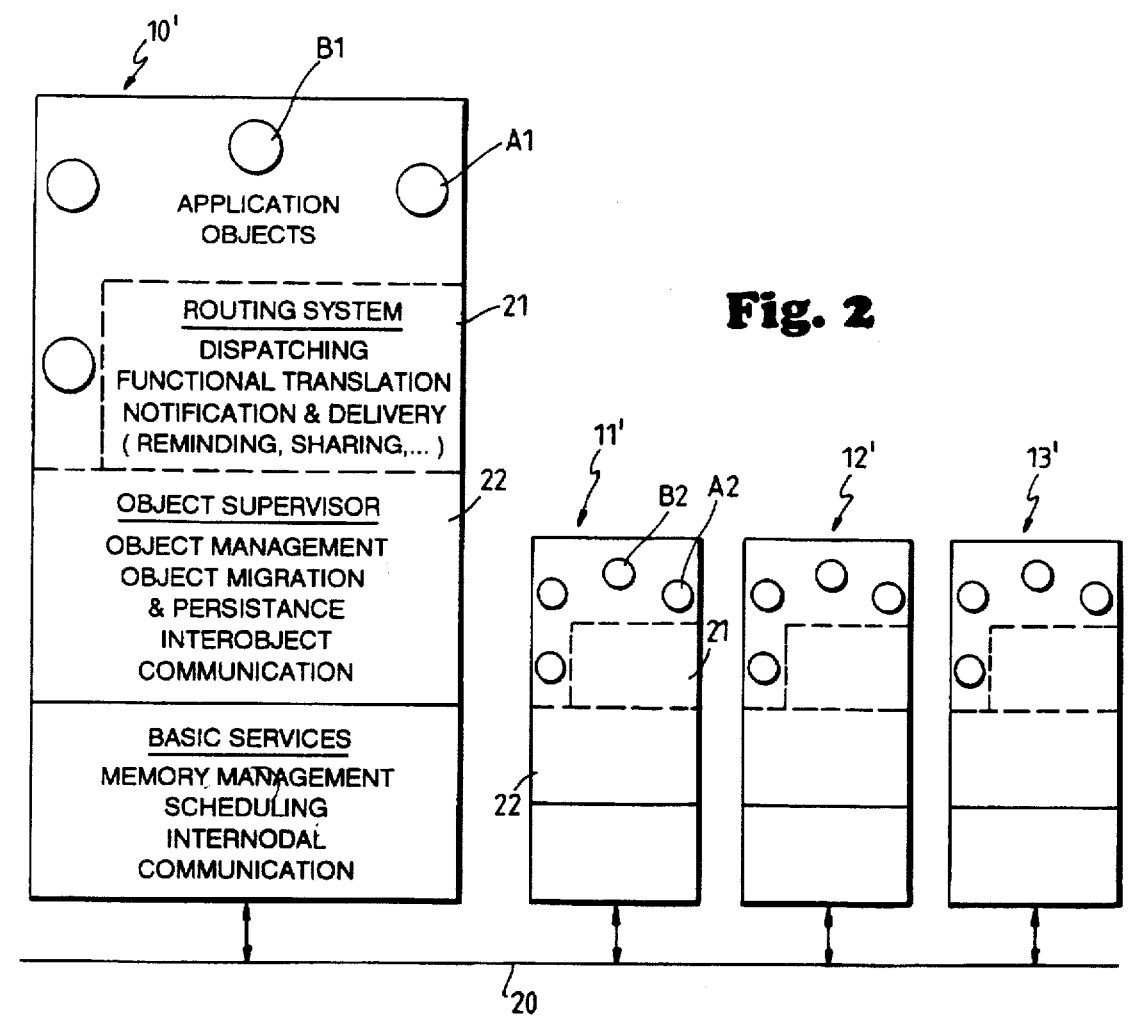
FIG. 2 is a logical representation of the service layers at each logical node implemented on a distributed computer system such as that of FIG. 1.

Referring to FIG. 2, the service layers and application objects of a distributed system such as the one in FIG. 1 are illustrated in logical format. A logical node 10', 11', 12' or 13' in FIG. 2 can be physically related to an address space accessed by a CPU 14 in FIG. 1 to execute code, and in the system of FIG. 1 (i.e., a workstation type of implementation) the physical address space is primarily in the memory 15; as mentioned, a physical node may be a mechanism other than a workstation. That is, a logical node 10'-13' is usually (but not necessarily) mapped to a single physical machine 10-13 of FIG. 1. In any event, each logical node of FIG. 2 supports object-oriented applications, where an application is composed of objects that might be dispersed over multiple logical nodes, or applications may share objects. System users, which may be human or automated functionaries, are represented in the logical system by objects. A logical node 10'-13' of FIG. 2 has a number of application objects $A_2$, $B_2$, $A_2$, $B_2$, etc., which are object instances (instantiated objects) known as local objects. An object is a uniquely-identified, self-contained logical entity that can be relocated between logical nodes. The definition of an object is essentially an abstraction that encapsulates data in a known way, with a known list of operations or methods to access the data, and the object has a unique identity, is mobile, and possibly persistent. It should be noted that the property of inheritance (as the term is used in object-oriented programming) is not needed here. An object resides as a whole at one logical node 10'-13' of FIG. 2 at a given time. Strictly speaking, an object cannot be modified unless the object is invoked and the object itself defines what can be done with it; either the object contains code (defined operations or methods) which migrates with the object, or the code resides at the logical nodes to which the object migrates and the code may modify the object as permitted by the object. An object can be stored on disk 16 as a file, or a group of files, but when "instantiated" it is in memory 15, identified by a handle or object name.

The node 10-13 includes a routing system (executable code) 21 according to the invention, as will be described. The routing system 21 requires certain services from the underlying system layers. For example, the operating system and CPU must provide some protection mechanism to prevent the object from being mitten over or any of its data or code modified while it is in physical memory 15, and this facility is usually part of the memory management mechanism in the basic services 22. Usually an object contains some mechanism for causing some action to be taken by the application it is under, such as forwarding, reminding, approving, etc.

To support object-oriented applications, a substrate of services referred to as the object supervisor 22 is included at each node 10-13. The object supervisor 22 supports object creation, management, persistence, and interobject communication. The object routing system 21 is an application-level service built upon the object supervisor's services.

An object has a globally-unique identifier that is used to locate it. At the application level, however, objects refer to each other by object handles, which are maintained by the object supervisor 22. When an object is created, the object supervisor 22 returns the object's handle to its creator. Objects may pass to each other handles of objects they know of.

Objects communicate with each other by invoking operations of their publicly-known interfaces. Invocations are location-independent: all the invoker has to know is the handle of the target object; it does not have to be concerned with the invoked object's location, or even with the fact that the invoked object may be moving while the invocation is attempted. It is the role of the object supervisor 22 to use a given handle to locate the target object of an invocation, invoke the requested operation, and propagate the result back to the invoker. The communications mechanisms and the methods used by the object supervisor 22 to achieve location-independent invocation (LII) are transparent at the application level; handles can be passed in invocation parameters and results. This location-independent invocation (LII) layer included in each node 10–13 is of the type disclosed in copending application Ser. No. 08/334,831 .(PD89-0142), filed Apr. 6, 1989 by Andrew P. Black and Yeshayahu Artsy, entitled "Locating Mobile Objects in a Distributed Computing System", and also described in an article by A. P. Black and Y. Artsy, "Implementing location independent invocation," Proc. of the Ninth Int'l Conf. on Distributed Computing Systems, IEEE Computer Society, June 1989, pp. 550–559 (a revised and extended version of this article was published in IEEE Trans. on Parallel and Distributed Systems 1:1 (January 1990), pp. 107–119). Each node also has a mechanism for internode communication, such as a remote procedure call (RPC) layer, which is an available utility. Support of interobject communications is disclosed in the article "Communication between highly-distributed mobile objects," by Y. Artsy, Second Int'l Workshop on Distribution and Objects, Apr. 6, 1989. Thus, application objects often need to "invoke" other objects, or locate other objects, usually for performing some operation on the other objects. An object can be invoked without performing any operation on the object if, for example, it is merely necessary to determine the object's location, but this is an unusual case and most invocations are for the purpose of performing an operation on the object. Application object $A_1$ can invoke $B_1$ with a local procedure call (transparently, via the LII layer) since both objects are located in the same node, but LII may use a remote procedure call or other means of remote communication to access objects in other nodes, such as $A_2$. Local and remote communications are transparent to the communicating objects.

The network of FIGS. 1 or 2 includes distributed stable storage service (not shown) that guarantees the persistence of stored data over any crashes, and the object supervisor 22 provides an interface to this service. Stable store sites may be in network servers, for example, which may be additional nodes just like the nodes 10–13, or may be implemented by the disk storage 16 on the nodes themselves. Each of the store sites supports (maintains a non-volatile copy of) one or more objects that exist on one or more of the nodes, and functions to ensure that the data it contains is recoverable if a node should crash. The stable store service allows objects to preserve their state and changes to the state, so in the event of a node crash the objects contained in that node can be automatically restored by the object supervisor 22 when the node comes up, or restored by other supervisors (perhaps at different nodes). Likewise, an inactive object may be removed from its node, and later restored upon invocation. The object routing system 21 assumes that an object requested for invocation either resides at some node 10–13 or can be restored from stable store by the object supervisor 22; this restoration can be delayed while a node is temporarily unreachable.

The object routing system 21 does not require any class hierarchy or inheritance between objects as is required in certain types of object-oriented programming systems. It does require the support of three object types and the notion of object attachment, but otherwise object types and how they functionally relate to each other are not of interest to the object routing system 21. The three object types are prinobject, folder, and action path. A principal in the system is any entity to whom an object may be routed, typically a (human) user, a group of users, an automated clerk, or an archive. It is represented by an object, denoted for short as prinobject. Where the principal is an automated program, the principal may actually be incorporated in its prinobject. A folder is an object used to group several objects for routing or migrating together. These objects can be "upcalled" by the routing system 21 (as described by D. D. Clark, "The structure of systems using upcalls,". Proc. of the Tenth Symposium on Operating Systems Principals, December 1985, pp. 171–180), and hence few interface requirements are imposed upon them. The action path object or APO type is used to specify the path of a routed object (of any type) and will be described below.

Attachment is used to simplify routing and migration. Objects of any kind can be attached to a folder, and each object may have an action path object attached to it. Attachment is merely a cross-reference maintained by the object supervisor 22. Attachment does not imply any functional dependency between objects, but is rather a convenient way to associate an action path object with a routed object, or to group several objects to be routed or migrated together.

Routing is the logical propagation of an object along an associated action path as defined in an action path object. An action path object can be created from predefined templates, copied from another path instance, or defined interactively by a user as an ad-hoc path. It can be attached to the routed object statically at object creation or dynamically thereafter.

Figure 3:
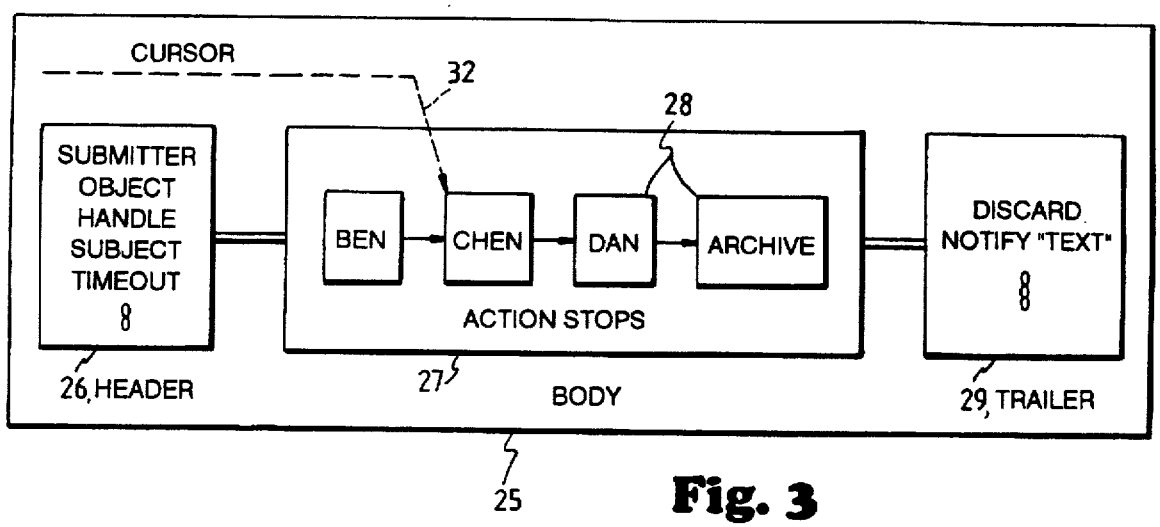
FIG. 3 is a logical representation of a sequential action path object used in the object routing system according to one embodiment of the invention.

Referring to FIG. 3, an action path object 25 conceptually consists of three parts: a header 26, a body 27 (a graph of action stops 28), and a trailer 29. The header 26 specifies who is the submitter of the routed object, that is, the first principal that has requested to route the object on the particular action path. The header 26 also includes some information about the routed object. The trailer 29 specifies what to do when the object reaches the end of the path. The graph 27 in between is the actual path the object has to traverse.

The action path of FIG. 3 illustrates an example in which the routed object is an expense voucher created by one principal, Ann, who works in the ADS group of a corporation. The expense reimbursement application requires that the voucher be approved (signed) by her manager, Ben, then the manager (Chen) of the cost center ABZ to which the expense is charged, and the accountant (Dan) controlling that cost center. The voucher is thereafter archived for tax and audit purposes. The action path object 25 attached to the voucher (object) specifies these principals as the action stops 28. The routing system 21 finds each of them and delivers the (computerized) form to them in turn.

In this example, the action path will be instantiated, set with the appropriate information, and attached to Ann's voucher object when she submits the object to the system (that is, when she dispatches it, as explained below). It should be emphasized that since an action path is encapsulated in an object, its internal representation is invisible to users and other objects, but users or objects can view the logical structure of the path. Being in an object, an action path can be invoked by whoever gets a handle to it, traced, and preserved in stable store. For protection reasons, only the object routing system may expand or change a path. If a user needs to alter a path, for example because of an exceptional event, the user may request the system to do so in a controlled way, or use a folder with an ad-hoc path to redirect the object on a different path, as discussed below.

The submitter's information in the header 26 includes its name and a handle of its prinobject ("Ann" and a handle of her personal object, in the example). This information can be used by other principals along the path to find who requires their action on the routed object, and by the object routing system to report special events to the submitter. The additional information in the header 26 indicates an application selector or application ID (which can be any generic symbol or specific ID for an application) and a textual description of the subject of this routing; in the example, these may be the selector of the expense reimbursement application, say "123", and the text "Ann's expenses attending the 10th ICDCS, 1990." The subject text can tell a principal (to whom the object is routed) what the object is about, without having to browse in the routed object; the application selector or ID can aid the principal's user interface (or prinobject) to select a course of action automatically, such as to enqueue a notification for the principal or to forward the routed object to someone else. In addition, the header 26 may indicate whether the path must be persistent over crashes; it may include a completion time value, by which the submitter or the application expects that the object completes its routing. As shown below, this value is used by the system to remind principals if this deadline is not met.

The trailer 29 lists the actions the object routing system 21 should take when the path is exhausted. The actions may include discarding the action path itself (the default), notifying the submitter Ann of completion, or invoking an application-specified procedure. Notice that the trailer 29 does not specify what to do with the routed object. This is left to the application to decide. For example, if an application requires that the routed object is archived at the end of the path, it may add the archive to the path as the last stop (as in the example), or the object may migrate itself to the archive's node after the last principal has acted upon it.

Figure 3A:
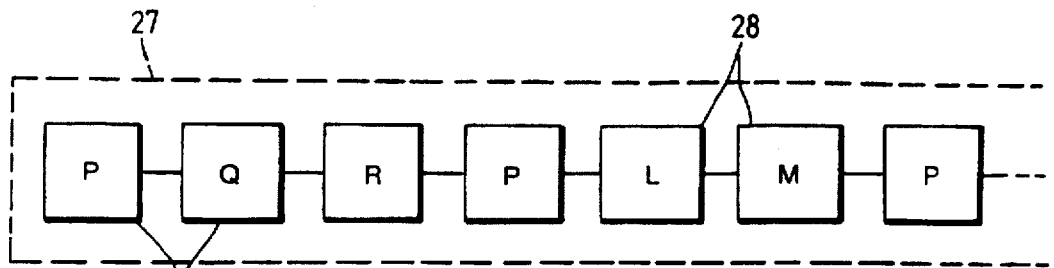
FIG. 3a is a logical representation of a sequential action path according to FIG. 3 in which a principal P must act more than once.

The set of action stops is described by a directed graph 27 of descriptors, one for each principal required to act on the routed object. Referring to FIG. 3a, in a case where one principal P has to act more than once on the same object O, for example to review the actions of those acted on O after P, then in order to avoid circularity, a separate action stop for P will appear for each time. The identity of the principal P and its location are translated each time the dispatch to P is invoked, so if there have been changes (relocations, vacations, reorganizations, etc.) these are taken into account.

Figure 5:
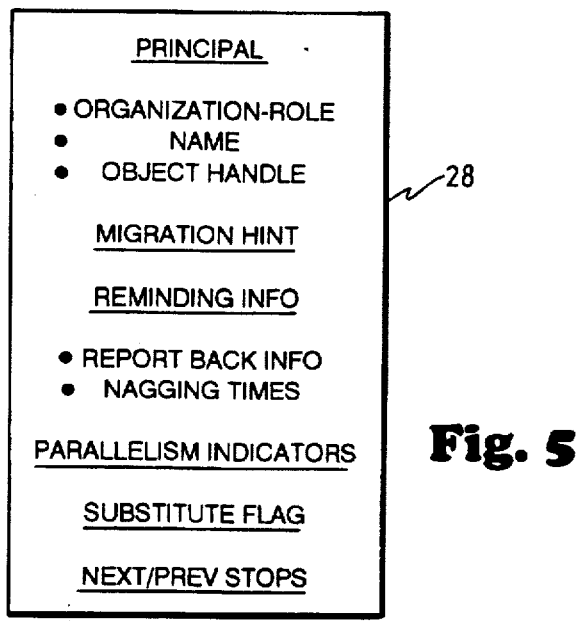
FIG. 5 is a logical representation of an action stop used in the action path objects of FIGS. 3 or 4.

An action stop 28 is illustrated in FIG. 5 and specifies the name of the principal and its organizational role. The role indicates why the object is routed to that principal; as in prior designs, a principal may have multiple roles. Typically, when the action path object 25 is created, only the role is specified in each action stop 28, and it is expanded by the object routing system 21 to the name of the principal that fills that role. To notify principals of their requested action, the system finds their names from roles and then their prinobjects from their names. To avoid repetitive role-to-name translation and searching for prinobjects, a handle for the prinobject is placed in its respective action stop. In this example, only the roles of ADS's manager, ABZ's manager, and ABZ's controller are initially specified; those are later expanded to Ben, Chen, and Dan, respectively, and handles of their prinobjects are added to their respective action stops. In another example, such as when one wants to route a memo to some of his colleagues, he may directly specify the names of the target principals.

An action stop 28 as seen in FIG. 5 includes additional information to guide the parallelism of the routing (that is, which principals are permitted to act concurrently), migration (that is, whether to co-locate the routed object, and perhaps the action path object, with the next principal), and timers for reminding principals (should they forget to act on the object within the specified time frame). This information is described in more detail below.

Figure 4:
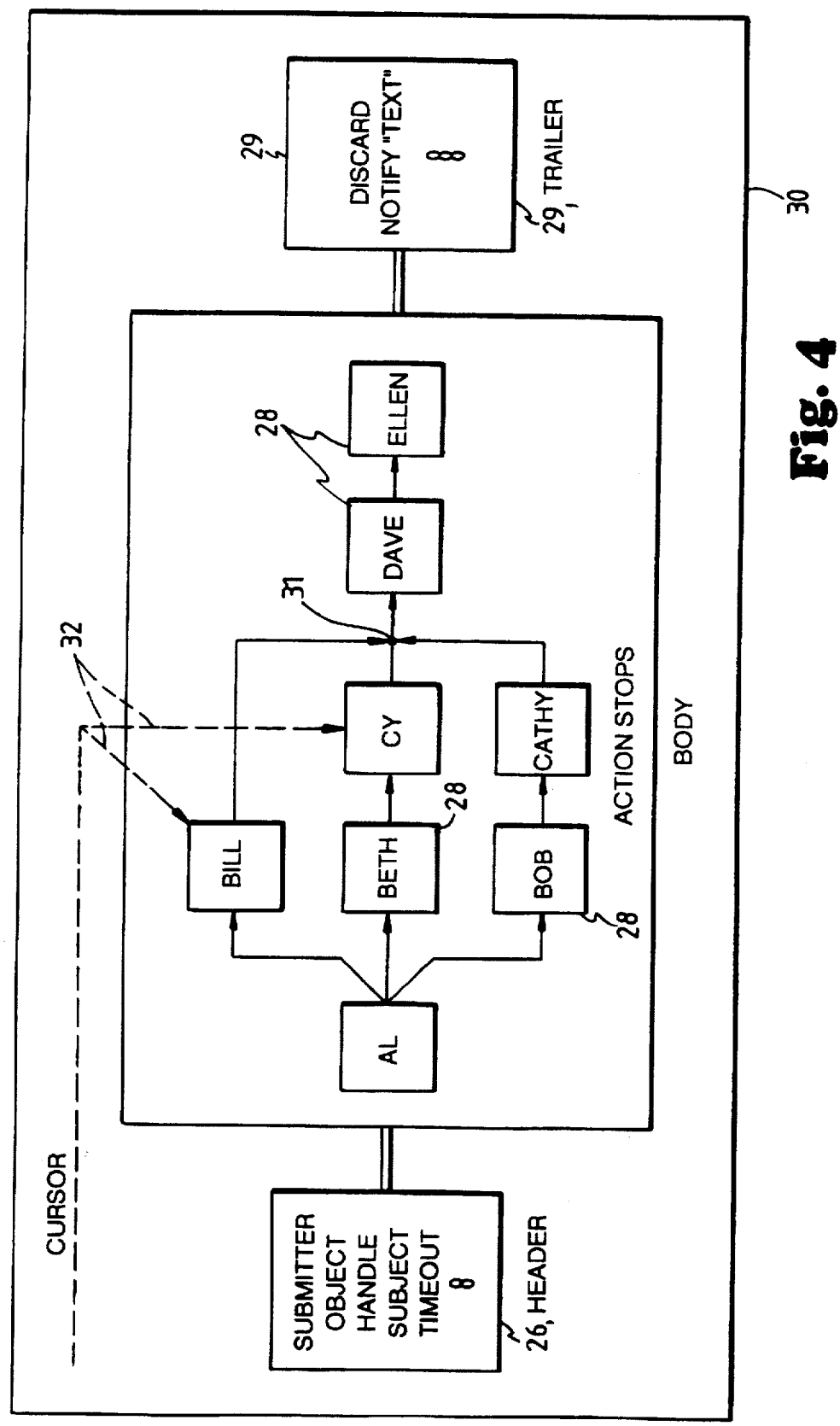
FIG. 4 is a logical representation similar to FIG. 3 but for a parallel action path object.

FIGS. 3 and 4 show examples of two action paths after name expansion, a sequential action path 25 in FIG. 3 and a parallel action path 30 in FIG. 4. Each has a header 26, a body 27 and a trailer 29. In the serial path 25 (which represents the example discussed above) the routed object would traverse serially from Ann to the four principals named as action stops 28. In the parallel path 30 of FIG. 4, the action stops 28 can be parallel rather than only serial. Thus, when A1 indicates that he has finished acting on the object, then Bill, Beth and Bob, will be triggered concurrently to act on the object; then Cy can start when Beth finishes, and Cathy can start when Bob finishes; they all have to finish before the object is routed via junction point 31 to Dave, and thereafter to Ellen. As shown, each path 25 or 30 includes a cursor 32 indicating the current stop(s). An action stop 28 becomes current when the object routing system notifies (or attempts to notify) its respective principal of their expected action; it becomes previous when its principal requests to dispatch the object to its successor (or its next) action stop(s), which then become current. The respective principals are referred to also as previous, current, and next principals with respect to the action path.

FIG. 5 illustrates the contents of an action stop 28. The reminding information specifies requests to nag this principal if it does not act on the object, and to report lack of action or successful dispatch to others. The parallelism indicators specify how to route the object if this stop has several concurrent successors or predecessors, e.g., after any, each, or all of their principals finish to act. The substitute flag, if set, indicates that this principal has been substituted by the one in the next stop(s), e.g., because the former principal was on vacation.

The user interface to create, use, and manipulate action paths is an editor-like function, and, for example, could be implemented in an icon-based graphic editor program; it is assumed that the user interface supports the basic operations to create a new path, to attach a path to a given object, and to show the path's current state. Other operations will be discussed below. At path creation, the creator supplies a list of tuples, one for the header, the trailer, and each stop, specified in logical terms. In the example, this list may look as follows (using some default values):

```
{
    (Ann, 123, "Trip to 10th ICDCS", 1 month)
    ((ADS manager) (ABZ manager) (ABZ controller)
    (corporate archive))
    (discard)
}
```

The above syntax could be interpreted by an editor program to create the contents of the header, trailer and action stops. The list for the example of a parallel action path 30 of FIG. 3 may be the following (where the square brackets indicate which sets of action stops may be parallel, and assuming that the names are provided by the submitter and the selector for marketing is 456):

```
{
    (Art, 456, "New Marketing Strategy Memo", 10 days)
    (
        (Al)[((Bill)][(Beth)(Cy)][(Bob)(Cathy)])(Dave) (Ellen)
    )
    (notify "Memo of 2/4 Reviewed", discard)
}
```

The object routing system 21 consists of two groups of interrelated mechanisms. In the following paragraphs, an overview of the process of object routing is given, it is shown how the mechanisms cooperate to fulfill this process, and details are given of the basic mechanisms necessary for object routing. Subsequently there are discussed additional mechanisms to improve control, handle errors and exceptions, support sharing, and accommodate parallel routing. These additional mechanisms, however, need not necessarily be part of the object routing system. Their services could be obtained from other mechanisms (including manual intervention), albeit less efficiently, less coherently, and less conveniently to the users.

Figure 6:
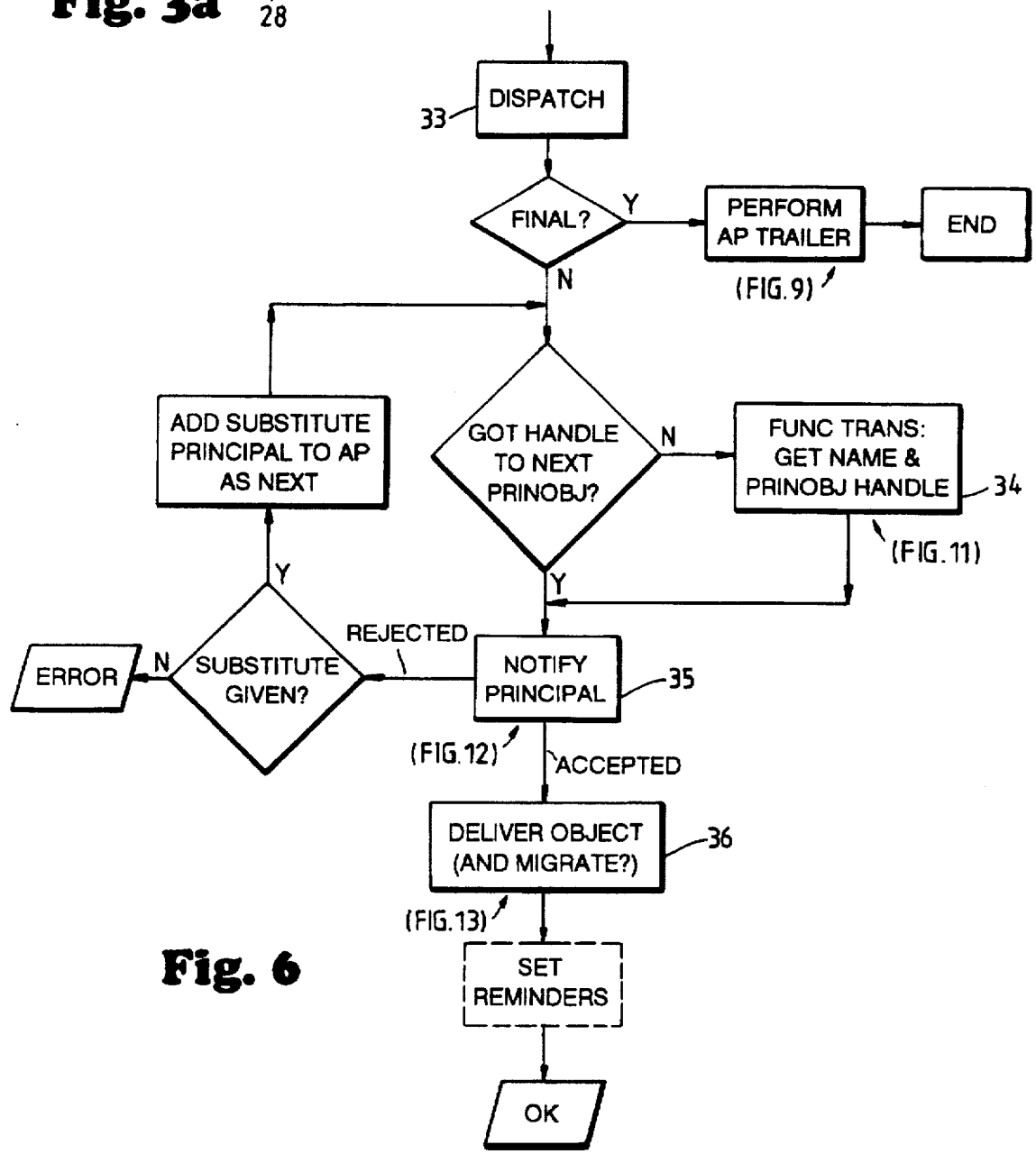
FIG. 6 is a flow chart of the method of routing from one action stop to another according to an embodiment of the invention.
Figure 14:
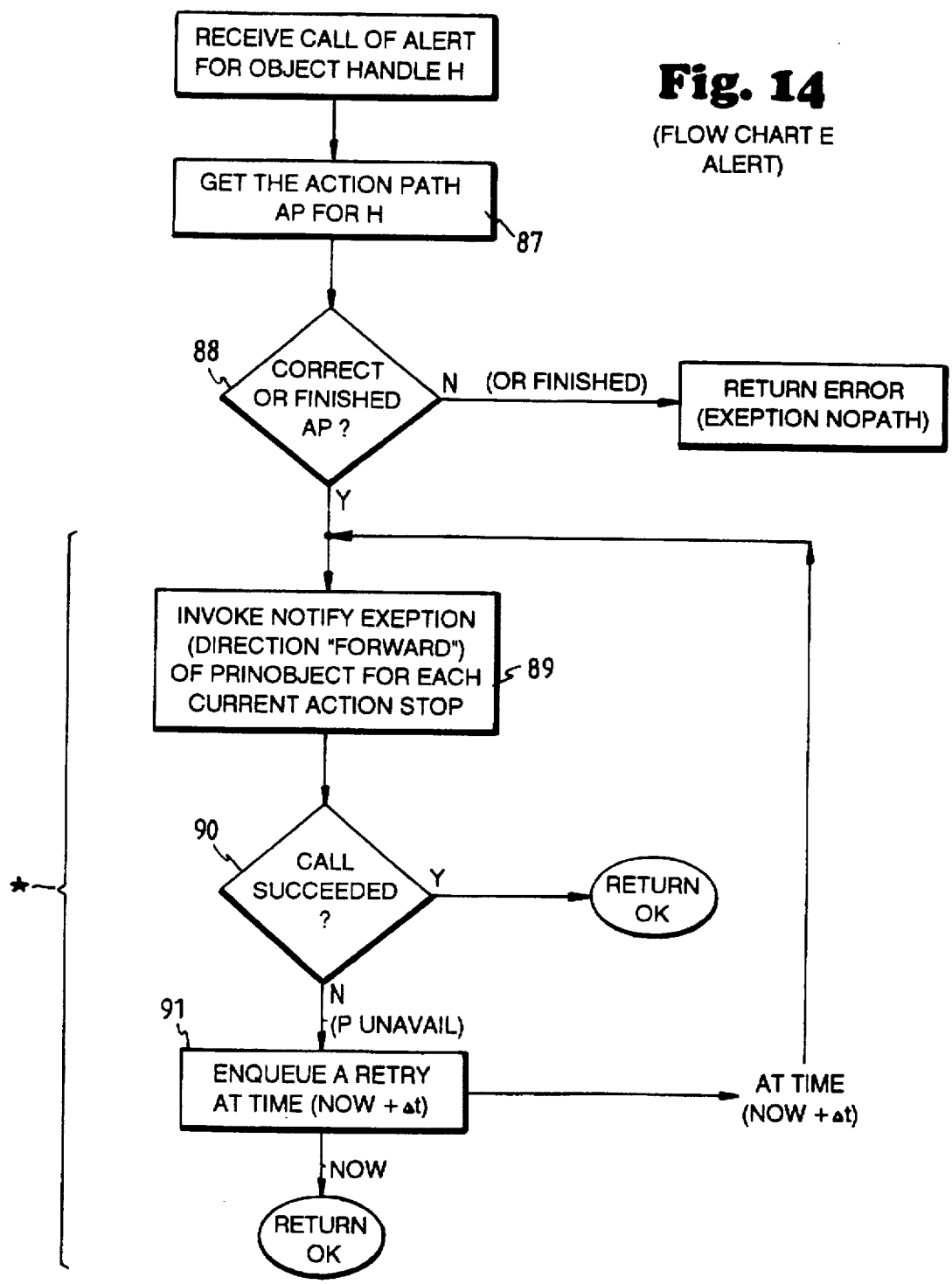
FIG. 14 is a more detailed logic flow chart of the method of handling the alert requests.
Figure 15:
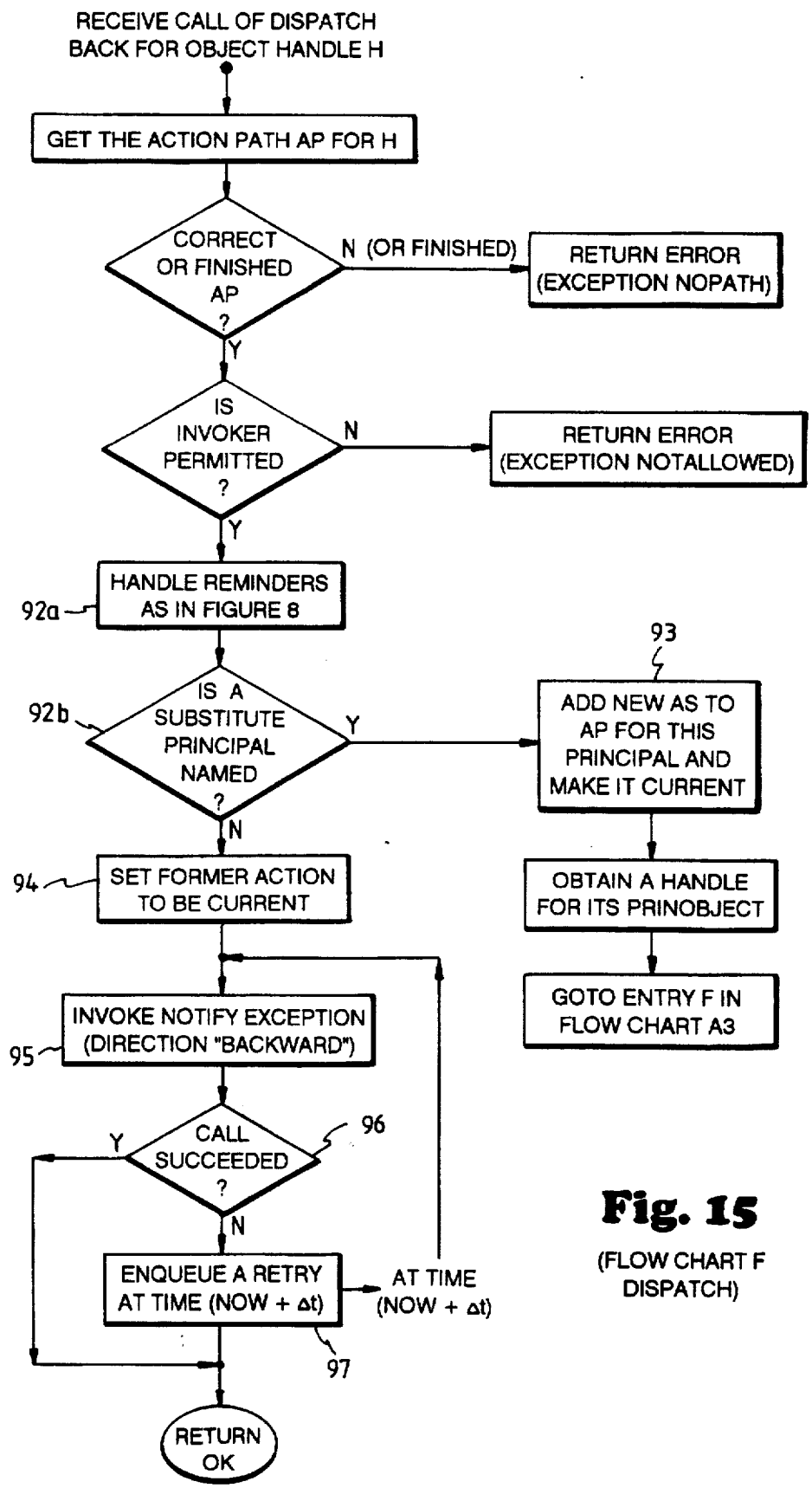
FIG. 15 is a more detailed logic flow chart of the method of handling the dispatch back request.

Referring to FIG. 6, the basic mechanisms necessary to implement object routing are: (1) the dispatching function 33, also illustrated in more detail in FIGS. 7-10, is responsible for propagating the routed object between action stops, triggering the other mechanisms in turn; (2) the functional translation 34 also illustrated in more detail in FIG. 11 is used to find principal names from functional description of organization structures and roles; (3) notification 35 which is illustrated in more detail in FIG. 12 is used to communicate with principals, in particular to tell them when the routed object needs their attention; (4) delivery 36 seen also in FIG. 13 handles the logical or physical move of the routed object to the next principal. FIG. 6 and the detail flow diagrams of FIGS. 7-13 show the flow of control between these mechanisms when the routed object is dispatched from one action stop to the next one. FIGS. 14 and 15 show the flow of control for two exceptional calls, Alert and DispatchBack, as described later.

The core of these mechanisms is dispatching 33, which is invoked by each principal along the path and initially by the submitter to indicate that it is finished with the routed object, and hence control can be transferred to its successor(s) in the path. The mechanism checks whether the name and object handle of the latter principal are included already in the next action stop; if not, it invokes functional translation 34 to fill in the missing items from the functional description in the stop. Once a handle to the new principal's object is obtained, it is invoked to pass information about the routed object to the principal. The prinobject in the notify mechanism 35 informs the principal by using whatever method the latter has preselected, e.g., via a mail message or a special queue. (Alternatively, the prinobject may perform the required actions itself, or reject the routed object altogether.) The delivery mechanism 36 then posts the routed object's handle with the prinobject. If migration is suggested in the action path, the mechanism 36 considers its benefits; if migration is found appropriate, the supervisor's migration service is used to move the routed object. A similar scenario repeats for each action stop. At the end of the path, dispatching 33 performs the completion actions as indicated in the action path trailer, and if requested, tells the submitter "the good news."

Table 1 lists all the interface operations of the object routing system in a Modula-2+ syntax. These operations can be called by the user interface, by a prinobject, or indeed by any object—but in any ease the call will indicate the principal on whose behalf it is made. For simplicity, there is omitted from Table 1 and the discussion below additional parameters and results that stem from security requirements, such as the caller's identity. Table 2 lists the object operations that the object routing system 21 might invoke (upcall).

The dispatching mechanism 33 is activated when a current principal is finished with the routed object and calls Dispatch. The handle parameter can be either the action path object or the object it is attached to. (Thus, you need only a handle to the routed object in order to route it. This is important because another principal may change the object's path or put it into a folder with another path, as discussed later.) Dispatch is refused if the referenced object has no action path or the path has been exhausted already. Otherwise, Dispatch returns successfully even if the actual transfer of control is delayed, for instance because the next prinobject is unreachable.

Dispatch is a generic operation, indicating that the caller has performed the required actions on the routed object. It is free from the semantics of any particular application: the operation does not check the state of the routed object to ascertain that control can indeed be transferred to the next principal. (This is a major distinction between the system of the invention and other application-specific designs discussed earlier.) It is left to the application and the principal at each action stop to verify that the former principals have correctly completed their required actions; if an error is discovered, the current principal can use other mechanisms to reroute the object, as discussed later. Adding to Dispatch 33 the capability to check the routed object's state could prevent mistakes such as accidentally dispatching an object too early, but this capability was not included since it would complicate the routing system, requiring that it cope with the semantics of different applications.

The Dispatch mechanism 33 checks whether the next stop contains that principal's object's handle. If not, it asks the Functional Translation mechanism 34 (FIG. 11) to get the next principal's name, if necessary, and gets a handle for its prinobject from the supervisor. Then, it invokes the Notify operation 35 on it, as discussed below, and sets the next stop to be current.

Notification may fail in two ways. First, the prinobject may be unavailable because of communication failure. In such a case, Dispatch will retry the invocation in a later time, and again at implementation-defined intervals until the object is available (the prinobject cannot be simply restored elsewhere unless it can be ascertained that the node where it currently resides has crashed, because otherwise the object might be replicated.) This delay could lead to a halt of the routed object if the network gets partitioned for a very long time. Fortunately, this situation can be discovered when some reminding timeout goes off, and the reminded principal can resort to the exception handling mechanism to resolve the stalemate. Second, the Notify operation may reject the call, indicating that the routed object should be directed to another (substitute) principal, for example because the notified principal is on vacation. In this ease the Dispatch mechanism adds the new principal to the action path as a substitute for the former one, gets a handle of its prinobject as above, and invokes it anew.

Provided the action path object must be persistent, Dispatch checkpoints in stable store its initial state, and thereafter it logs all the modifications to the path, including changes to the current set of action stops and role-romaine translations. Should an action path be lost in a node crash, it can be restored from the stable store. For efficiency, an action path object may migrate with the routed object, and its log records can be stored in a local or near-by stable store.

Several issues arise in the design of the dispatching mechanism. Since it does not check whether the routed object is "ready" to be transferred to the next stop, should it at least let the object check such readiness? In other words, should Dispatch invoke an object-specific operation to approve the dispatching? Such an operation could also perform some pre-dispatch chores, if necessary, evaluate migration, or add application-specific policy without reducing the application-independence of the object routing system. This extension was omitted for simplicity, especially since several objects may share a path and be dispatched together; calling each of them to approve the dispatching would complicate the mechanism, and it is not clear what to do should some of them approve while others disapprove the dispatching.

Another issue is whether dispatching should be allowed only to the current principal, to other principals on the path as well, or perhaps to any principal. It was decided to restrict the operation to the current one(s) only, for reasons of simplicity and protection. If any principal is allowed to dispatch any object at any time, confusion and errors may prevail. Although in some cases it might be desirable to let other principals intervene (for example, when the current principal refuses to act on the object) these cases can be handled by other means. For example, one may use a folder with an ad-hoc path to reroute the neglected object to the appropriate problem-handling authority.

Figure 10:
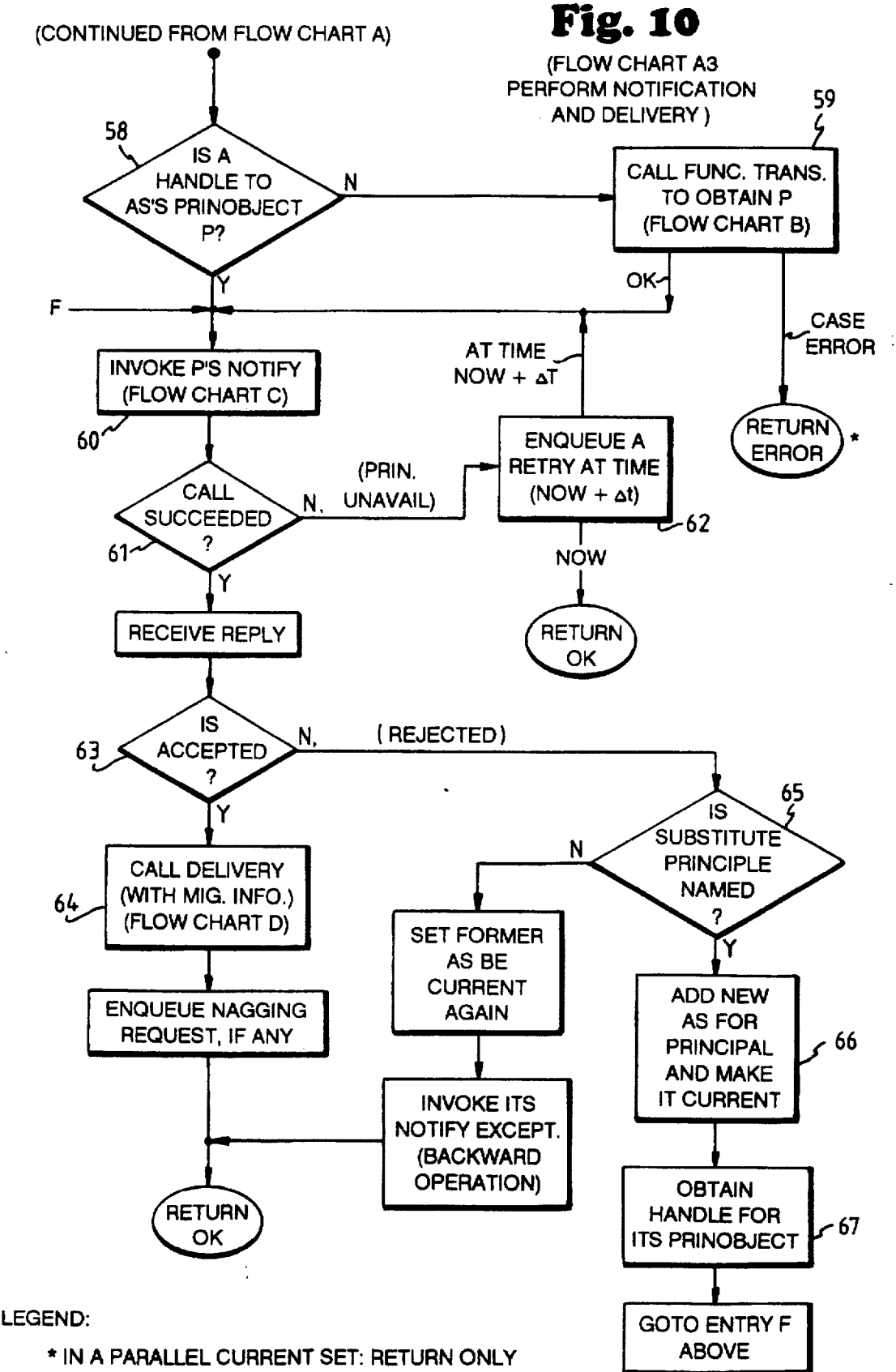
FIG. 10 is a more detailed logic flow chart of the step of performing notification and delivery in the method of FIG. 7.
Figure 11:
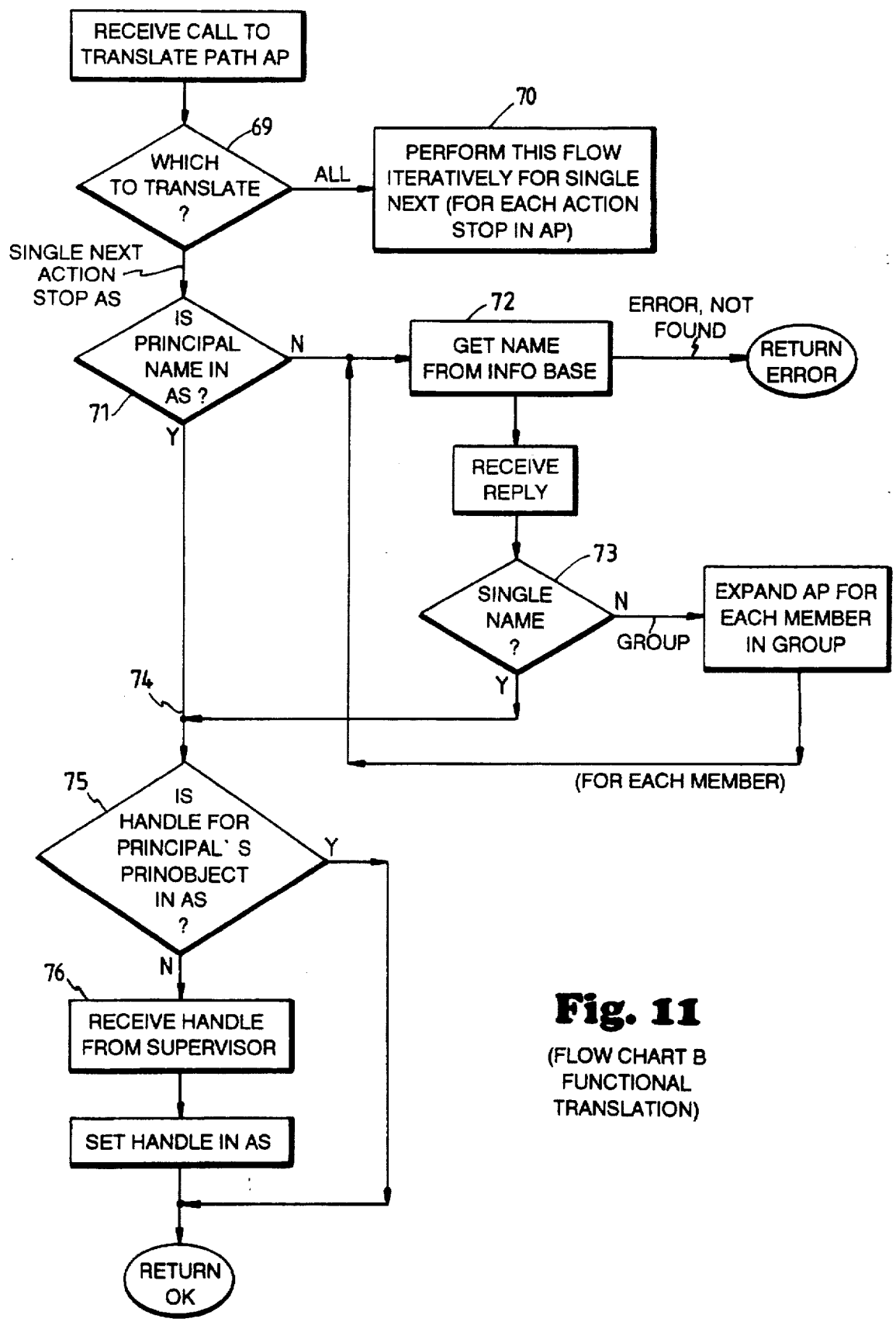
FIG. 11 is a more detailed logic flow chart of the step of functional translation in the method of FIG. 6.

The functional translation mechanism 34 of FIG. 6 and FIG. 10 provides translation of roles in organizations to principal names, as well as the inverse function. This mechanism requires a system-wide information base, which lists all the organizations in the system, all the principals, and the associations between them. To clarify the components of this assumption, system-wide refers to all the organizations in the scope of the routing, that is, all recognized organizational units (e.g., groups, labs, cost centers) to which the routing system is expected to route an object. For example, in a corporation this term refers to the corporation's entire distributed system. If the latter is part of a larger network (say, network connecting several corporations to one distributed system) and objects may flow between the corporations, then system-wide includes the combined network. The information base may be implemented in several ways such as a centralized, partitioned, or replicated database, a name service, or an expert system. Associations are well-defined attributes of the organizations and the principals that cross-refer to each other. Obvious attributes include member (listing the principals in an organization), manager, and secretary, as well as an organization's parent and child organizations.

The role of this functional translation mechanism 34 is to interrogate the information base and fetch the required names using the information given in the path. In the example it would query the information base to obtain the principal names for the tuples (ADS manager), (ABZ manager), and (ABZ controller). To obtain the name of the latter controller, it might need to get first the name of the parent organization of ABZ (the accounting organization), then the appropriate controlling child organization, then the controller's name. It then fetches the object handles for Ben, Chen, and Dan, and places them in the form's action path. If the approval chain would have required also Ben's manager's signature, this mechanism would effectively call the compound function Gethandle(manager(organization (Ben))).

It should be emphasized that this functional translation mechanism 34 has limited capability, as it is restricted to whatever data and associations can be retrieved from the information base. For example, it presumably would fail to translate such roles as "the technical leader of project X" or "all attendees of yesterday's seminar." Consequently, when one wants to create a path that cannot be expanded by the functional translation mechanism 34, for example to send a memo to those attendees, one has to find their names by other methods outside the routing system. The mechanism scales as well as the information base scales.

Translation may return a set of principal names, for example when the name or role indicated in an action stop implies members of a group. In such a case, the corresponding action stop is expanded to multiple parallel stops as illustrated in the parallel action path object 30 of FIG. 4; the object will be routed to all of them concurrently (by default), or according to the parallelism indicator of the original stop.

An important issue is when to perform the translation 34. In one application, for instance, the cost center manager to sign Ann's voucher should be the manager at the time when she submits the voucher, whereas in other applications it should be the manager at the time the voucher is ready to be routed to that manager. In the latter case, binding a name to a role too early may lead to rejecting the voucher by the "target" manager. The system, however, should allow both (or indeed any other) translation-time options. Hence, default and dynamic translation are supported. By default, translation is done at a time most convenient to the object routing system: if translating the entire path at once is more economical than invoking the mechanism separately upon each dispatching, then expand all the stops at path-creation time (as currently done); otherwise, it postpones the translation as late as possible to avoid stale information. In addition, the routing system provides the operation Translate (see Table 1), which applications can call at their convenience, indicating whether to translate the next or all the remaining action stops. The application can then choose when to translate, without being concerned with the tedious details of the mechanism. Note that nonetheless translation may be erroneous, either because a role has changed after the translation, or because data in the information base is not up-to-date. In such a case the object might be routed to the wrong principal, who may then use the exception handling mechanism (discussed below) to overcome the problem.

Figure 13:
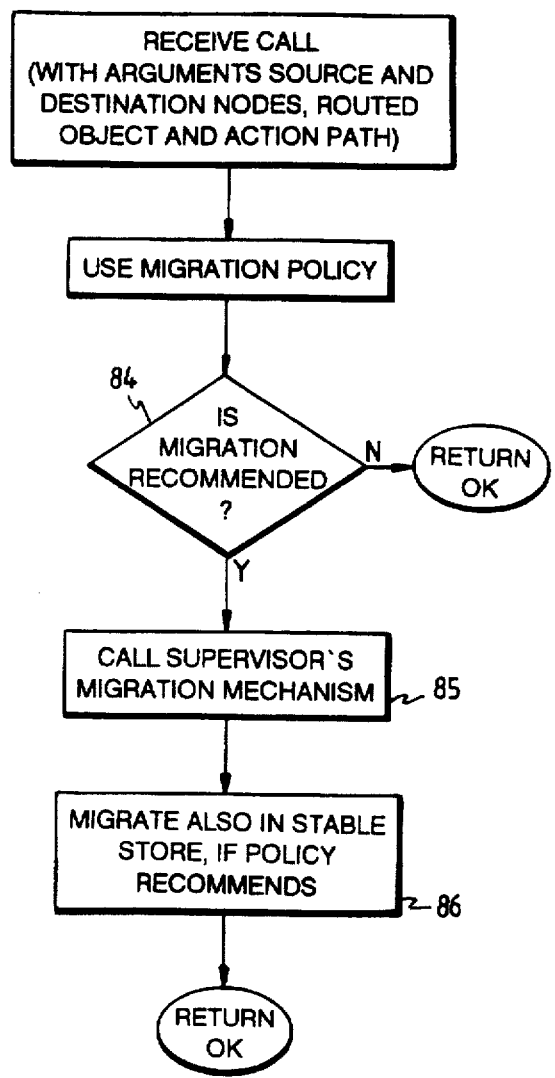
FIG. 13 is a more detailed logic flow chart of the step of delivery in the method of FIG. 6.

Once a handle to a prinobject is obtained by functional translation 34, it is used to notify the principal of the requested action by the Notify mechanism 35 of FIG. 6, also illustrated in FIG. 13 and Table 2. But different principals would presumably prefer to be notified by different means, such as a blinking icon, a mail message, a message in a specified window, a note enqueued in some mailbox, or direct invocation of a set of operations. A principal may even require different styles for different applications or roles. In some cases a principal may need to re-route the object to another principal; for example, Ben may want to redirect all expense vouchers to Beth while he is on vacation, and otherwise to Bill, his secretary. How would a generic routing system choose a style that fits them all?

A single interface operation of the prinobject, Notify, (see Table 2), is used instead of alternative interface operations. The prinobject, receiving Notify, decides what action to take as determined by its own internal code. The prinobject would contain an indicator of how to notify its principal. This indicator may apply to any role and any application selector or ID, or it may consist of a decision table (a small profile) that specifies the preferred notification method for each role (or a set of roles, or all), and for each application selector or ID (or a set of selectors, or all). It is assumed that the user interface allows principals to set and modify these indicators dynamically. A default could be to enqueue at the prinobject a descriptor composed of the parameters to Notify, and let the principal preview and delete such descriptors. Notify includes additional parameters taken from the action path (such as role and subject) for the convenience of the principal.

The invocation of Notify indicates whether the action path suggests to co-locate the routed object with the principal. If this is the case, the Delivery mechanism 36 (at the destination node) is triggered to evaluate the benefit of migration.

This mechanism may use a very complex policy, which compares the cost of migration against the cost of predicted accesses to the routed object, or a straightforward (and preferred) one that approves migration whenever requested.

As an alternative to a generic Notify operation that lets the principal/prinobject decide what to do, there may be encoded in each action stop the operation (or even a script of operations) that the object routing system would upcall, which is conceptually similar to the approach taken in the Imail and Message Management System mentioned above. Although this approach may simplify the prinobject's interface, it complicates the object routing system. In particular, it requires storing different application-specific arguments (or even lists of arguments) in an application-independent action path, and letting the object routing system interpret them. Additionally, it raises the question of when to bind values to the parameters (deep vs. shallow binding), which may be differently answered by each application. For simplicity reasons, a single Notify operation with a well-defined interface is preferred.

There are several additional mechanisms which may be added to improve the object routing service. First, since it is not required that principals act immediately on the routed object, some principals may defer their action for a very long time or even forget the pending action. So, a means to "nag" them if they are not sufficiently prompt, as well as report the lack of action or progress to other principals that want to be informed, is desirable. Second, errors in role-to-name translation may occur and unforeseen situations may arise and force a different course of action. Hence, a mechanism is needed to handle routing errors and exceptions. Third, not all objects need to be routed sequentially on independent action paths. In different applications or circumstances it might be necessary to route multiple objects on a single path, copy or move action paths between objects, or route an object concurrently to several principals. Therefore the object routing system is extended to support path sharing and parallel routing.

There are several design issues related to a reminding service: who is to be reminded, how and when to remind, and how to implement a distributed reminding mechanism that is robust and efficient. First, whom to remind and on what occasions? To keep the service general, it is preferred to let any principal choose when they want to be reminded, and on whichever event related to a given action path. Specifically, a principal may choose the following variations: (1) To nag another principal (say, the one of the third action stop) if the latter fails to dispatch the routed object within a specified period or by certain time. This service, however, should be used cautiously, as the nagged principal may not yet have gotten the object at that time. It is therefore more appropriate to be used with time relative to the last dispatch request. To prevent users from abusing this service, the identity of requester will be provided to the nagged principal. (2) To ask for a negative report in the absence of action as in (1). This can be useful to discover lack of progress; the reminded principal can then resort to other means to push the negligent principal to act on the object, or to transfer the object to another principal, as discussed below. (3) To ask for a positive report, indicating that the object has been dispatched from a given action stop. This service can be used to monitor the progress of the routed object.

These three variations of a reminding service allow powerful and flexible monitoring of the progress of the object along its path, and reaction as soon as necessary in the absence of such progress. Notice that the reminding service by itself does neither affect the path, nor change the state of the routed object, and hence any principal is permitted to use it. It might be the case, however, that some applications may not want to reveal the state of the path to any principal (even though the principal has a handle to the routed object). In this case the object routing system would need a more restrictive protection mechanism, for instance using access rights for any operation regarding an action path. This extension is discussed below.

The second issue is how to specify the time for reminding? One can specify a list of timers, or a function to be called to evaluate the next timer. A simpler function which is supported is similar to a for loop, or an iterator. A timer is the pair (base value, interval), where the base value may be absolute (say, 9/13/1990 at 5:37) or relative (say, a week from the last Dispatch), and the interval is a repetition value added to the base. The reminder would then be re-issued by the system until canceled either explicitly or implicitly when the object is re-dispatched.

In a large distributed system this might not be so simple, as it cannot be assumed that clocks are always synchronized. Indeed, clocks at different nodes may skew. So if P wants to nag Q at a given (absolute) time, at what real time should Q be nagged? The preferred solution is that each reminder is handled at the node where it was issued (P's node in this case), and hence refers to that node's local time. The only requirement is that time is monotonically increasing at every node.

Reminders can be requested by the application at path creation time. In addition, a principal may set a reminder dynamically by calling SetReminder, or the user interface may integrate such a call with Dispatch. The call indicates whether it is for nagging or reporting (positive or negative), and which action stop it is associated with. It provides a message (the "message" parameter) to be included at the actual nagging or reporting—to put the nagged or reminded principal in context. Principals can use CancelReminder to remove their pending reminders. Otherwise, reminders are removed by the dispatching mechanism upon Dispatch or when they expire.

Third, how does reminding work? When a reminder is requested, it is enqueued at the reminding service and a reference to it is put at the respective action stop. Nagging and negative reporting take place when timers expire, at which time the reminding service upcalls the respective prinobject's Nag or Report operations, respectively (see Table 2). The parameters passed to these operations are similar to those passed to Notify, and serve a similar purpose; the msg parameter is the text provided to SetReminder or, by default, the subject text associated with the path. Otherwise, before the Dispatch operation completes, it checks whether the current action stop includes references to reminders. If so, it asks the reminding service to delete requests for nagging and negative reports associated with this stop, and to perform all requests for positive reporting. This is also done by calling the Report operation of the appropriate prinobject.

Finally, an important issue in designing this service is how to make it robust and efficient. Keeping reminders in one node (say, the requesting node, as discussed above) does not guarantee robustness, since the reminders may disappear should the node crash. Storing them in a replicated database would be very costly and still depend on the database consistency and its ability to recover safely. The preferred solution is to use the stable store service and to rely on a distributed boot service: it is assumed that these services are highly available, and should servers providing them crash, they will be brought up relatively quickly. Reminders are kept in persistent objects, which are registered as highly available. Should the node where such an object resides crash, the appropriate stable storage server will trigger the boot service to reboot that node, and consequently restore that object. Notice that in such a scenario a reminder may be slightly delayed, which is not a problem for most applications. (This may be a limitation, however, for hard-real-time applications.) As to the efficiency of the service, there is no attempt to optimize its cost, but rather to make the cost proportional to its use.

Sharing an action path is an important feature of the object routing system of the invention. There are basically two forms of sharing an action path by multiple routed objects: continuous or momentary. In the first form the path is conceptually attached to two or more objects; any Dispatch operation affects them all, and any modification of the path is consequently reflected in routing each of them. In the second form a path is copied or transferred from one routed object to another one, after which point they do not share the same path any more. A third form may exist, in which an object shares multiple action paths, but this form is viewed as exceptional and a source for confusion, and hence is not supported.

To simplify the handling of continuous sharing, a folder object is used to group the involved objects. Rather than attaching the path to multiple objects, it is attached to a single folder, to which all the other objects are attached. Dispatching the folder is semantically equivalent to dispatching all the attached objects at once. For example, suppose that Ben wants to attach a memo to Ann's voucher and route the two together on the same path; he can do so by attaching the two objects to a folder, and use the Transfer operation (Table 1) to transfer the voucher's action path to the folder. Alternatively, one can insert an object into a folder simply for aggregation, for instance to keep together all of last year's expense vouchers. An inserted object does not share the folder's action path. In any case, one can later remove the object from a folder. The interface of the folder object type, therefore, should include the Attach, Insert and Remove operations.

The object attached to a folder might be a folder too, and indeed a hierarchy of attachments may exist. The action path should be attached to the top-level folder in this hierarchy; using it for routing affects the entire tree of attached objects. Because each attached object points to the object it is attached to, finding the common path for display or dispatching is possible even when the user has a handle of only one of the attached objects.

At times it may be useful to attach an object to a folder temporarily, with the intention to resume later the routing of that object on its former path. For instance, Ben in the example above may want to send the folder to another supervisor for consultation (that is, on a new ad-hoc path), and afterwards continue routing the voucher on its original path. To this end, it is not required that an object O with an attached action path object APO loses it when O is attached to a folder. However, if the folder has already an (active) action path, or is itself attached to a folder with an active action path, O cannot retain an active action path; otherwise, O would effectively share multiple paths simultaneously, and dispatching it would cause confusion. To prevent this, one may call Suspend to deactivate the path, and then later call Resume to reactivate it. Notice that Resume fails if the target object is itself attached to another object with an (active) action path.

Momentary path sharing is supported by two operations. Copy merely duplicates an action path object and lets the caller decide to which object to attach it, and Transfer reattaches an indicated path to another action path object, deleting the path from the former action path object.

It should be noted that letting anyone freely transfer action paths from one object to another, or transfer objects from one folder to another, may violate protection requirements of certain applications. Yet such capability might be desirable in certain situations, as the previous discussion indicated. To cope with this conflict the object routing system does allow path transfer, suspension, and resumption to whoever has a handle to it, but these actions are recorded in a history log associated with a path and can be traced down. A more restrictive protection mechanism may require capabilities for such operations, as discussed below.

Parallel routing is another feature of importance in the object routing system of the invention. An action stop may have multiple immediate predecessor or successor stops, i.e., a parallel path as seen in action path object 30 of FIG. 4. In such a case when the stop's fan-out or fan-in is larger than one, the question is which branches to choose: all, any, or some? Specifically, when an object is dispatched and there are multiple next stops, should the object be routed to all of them concurrently (all-out), or should some selection function be applied? Similarly, when a stop has several predecessor stops, can it become current when all (all-in), any, or some of them dispatch the object?

The earlier discussion (for example, regarding FIG. 4) alluded that when the fan-out and fan-in are greater than one, the functions controlling parallelism are all-out (such as with A1) and all-in (such as with Dave). However, some applications may prefer other possibilities as well. For instance, a proposal dispatched concurrently to multiple reviewers can be acted upon by a coordinator once a majority of approvals or rejections has been collected. The question is how a generic object routing system would know what the application might want.

One alternative is to associate conditional expressions with action stops, and let principals enable the conditions, for example via Dispatch. (A conceptually similar approach was used in the message management system discussed above.) This approach was not used here because it puts application-specific variables and semantics in the path. Another alternative is to let principals select the parallelism function via Dispatch. This would require that principals know the topology of the action path at their stops, and could cause confusion when principals in a parallel graph choose conflicting functions.

Instead of these alternatives for parallel routing, the functions all-out and all-in are supported as the defaults, and the application is allowed to specify other functions if necessary. Specifically, when an object is dispatched at a stop that has multiple successors, it is routed concurrently to all of them (unless another function is specified); if a stop has multiple predecessors, it cannot become current until all of them have dispatched the object. The system provides additional functions to choose from, such as first-in, majority-in and each-in, meaning that (in the example object 30 of FIG. 4), Dave can become the current principal when either Bill, Cy, or Cathy completes (first-in), or when the first two of them complete (majority-in), or every time each of them completes (each-in). The application may set the parallelism indicators of each action stop (see FIG. 5) to either of these functions or to an application-provided function. The indicators may be set either at path creation, or by dynamically calling SetParallel (see Table 1). (The "which" parameter is a number associated with an action stop—which can be retrieved from the action path-or the concurrent one by default, and "arg" is an uninterpreted value to be passed to the indicated function "f".) For protection, a principal may call this operation only to affect its respective action stop, but not others. This function will be "upcalled" by Dispatch whenever a decision has to be made regarding the parallel routing at the corresponding stop. For simplicity and generality all application-provided functions have to adhere to a standard interface (see the par-in and par-out functions in Table 2). The par-in function decides when a stop with multiple "incoming" arcs may become the current one, and the par-out function decides which stops on "outgoing" arcs may become current.

One problem with parallel routing is how to handle migration: since it is assumed that the underlying system does not support object replication, the routed object may only be migrated to at most one of the parallel principals. It may be reasonable to migrate the object to one principal's location, if most of the parallel principals are located there anyway, or if that principal is expected to have relatively more frequent interaction with the object. On the other hand, the object should not be migrated to any location if all these principals are dispersed and would interact with the object similarly and concurrently. The question, then, is what alternative to choose. Letting either the application or the routing system decide may incur complexity on both. It is preferred instead to refrain from migrating the object when there are multiple next stops, even when the migration hint suggests migration. This policy trades off potential inefficiency in interacting with the object in some cases (because these interactions will involve remote invocations) for the simplicity of the routing system and efficiency in other cases (because multiple migrations are saved).

Exceptions will now be discussed. The smooth routing of an object may be disturbed in basically three situations: (1) the next prinobject is unreachable and therefore Notify fails, as alluded to above; (2) the current principal finds an error and wants to report it back or return the object backward on its path (for example, in the case of Ann's voucher, Chen may discover that the expenses were excessive or that Ben has not signed correctly, and hence may want to return the voucher to Ben); (3) a former principal discovers a condition that is relevant to the routed object and wants to bring it to the attention of the current principal(s) (for example, the submitter of the memo of FIG. 4 may find out that the review of the memo by all designated principals should complete earlier than thought before).

When the next prinobject is unreachable for notification, the routed object cannot proceed on its action path and hence might be late on deadlines or even starve. As discussed before, should the invocation of Notify fail, Dispatch would retry it at fixed intervals (implementation-defined values) until it succeeds. Notice that it may happen that the invocation of Notify succeeds but the reply fails due to communication problems. This may lead Dispatch to believe that the invocation failed and hence to repeat it. This is not considered to be a problem since Notify or the notified principal should be able to recognize the duplicate call. If the network is partitioned and the next prinobject is unreachable for a long time, the routing system relies upon the reminding service or the impatience of some principals to solve the problem as mentioned above. For example, a principal can break the routed object's stalemate by attaching it to a folder and routing the pair on an ad-hoc path to the proper authority.

In the second example of an exception, the current principal may return the routed object backward in two ways. If the error is discovered when Notify is called, Notify can reject the call and optionally return the name of another principal to whom the object should be routed. Alternatively, if the error is discovered later, the current principal may call DispatchBack (FIG. 15) to reject the object. The call can name a substitute principal, as can Notify upon rejection, and an optional textual explaining the reason for rejection. If no substitute name is given or if it turns to be wrong, the object is routed back to the former principal(s), which becomes the current principal again. The principal will be notified of that event via NotifyException (Table 2). (If the invoked prinobject is now unreachable, the invocation will be retried again as in the case of Notify. Also, DispatchBack cancels previous reminders similarly to Dispatch—see block 92a in FIG. 15). The parameters of this operation are similar to those of Notify and serve a similar purpose, and the "reason" and "direction" parameters provide additional explanation. If the error is severe, that principal may DispatchBack the object again, and so forth all the way back to the submitter. This is conceptually similar to backward exception propagation in programming languages.

In the third example of an exception mentioned above, one can attract the attention of the current principal(s) by raising a forward exception via Alert (see Table 1 and FIG. 14). The dispatching mechanism will notify the current principal(s) via NotifyException as above (with "direction" set to Forward). The notified principal may then decide how to react, for instance to act quickly on the routed object, or, in the case of an error, to return it back via DispatchBack.

Figure 7:
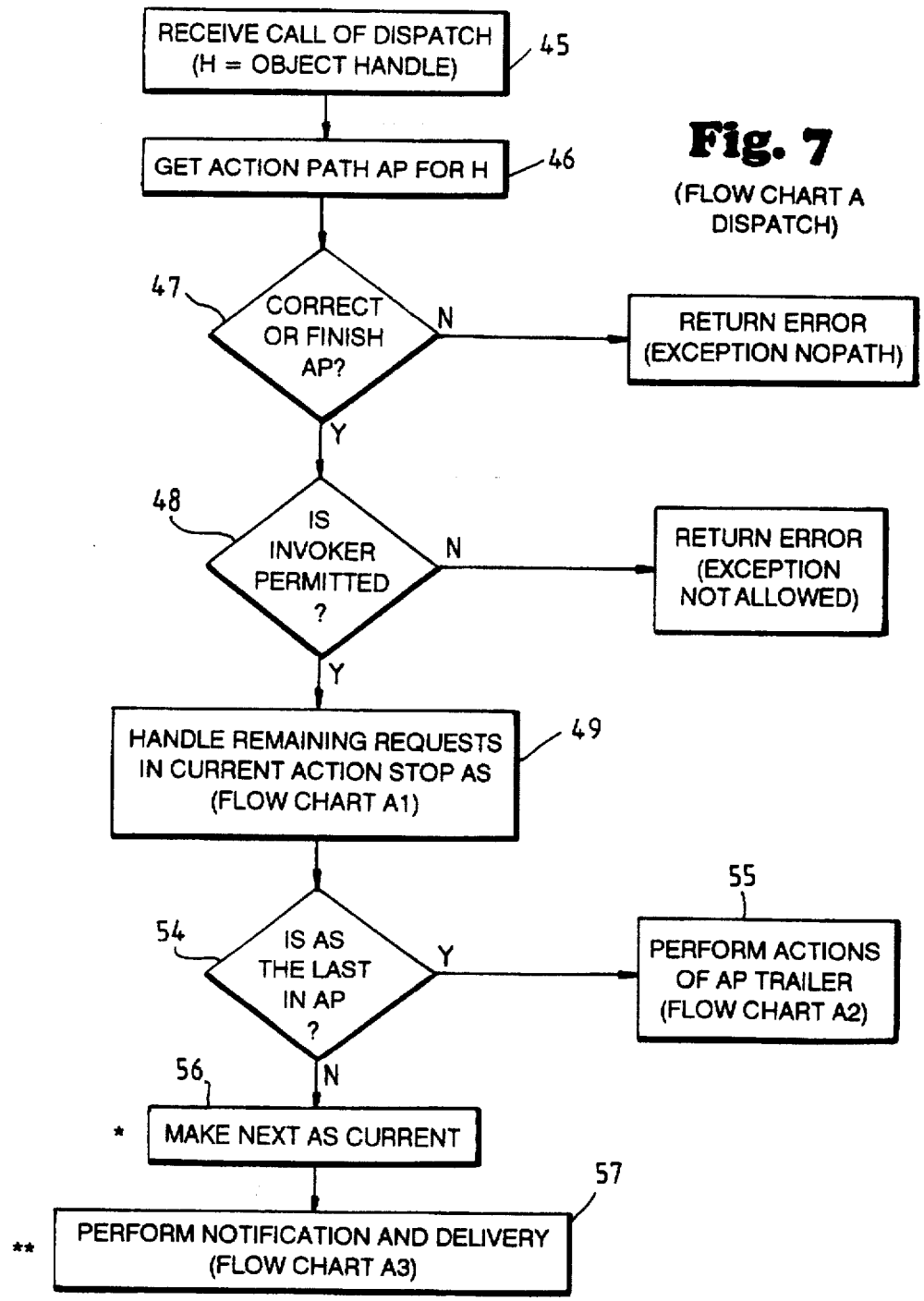
FIG. 7 is a more detailed logic flow chart of the dispatching mechanism of the method of FIG. 6.

Referring to FIG. 7, the flow of control in executing the dispatch operation is shown in more detail. A node receives a call of dispatch for the routed object at entry 45, where the routed object has a handle h, and the action path object for this routed object h is obtained at block 46. The action path and the invocation are checked to see if they are correct and permitted at points 47 and 48, with an error returned if not. The requests for reminding actions in the current action stop are executed as represented by the block 49, which includes the actions of flow chart A1, FIG. 8, where each request is checked to see if it is for nagging or for negative report at decision points, and if not then the reminding function is called to invoke the prinobject's report operation for a positive report, at block 52. If either nagging or negative report then the request is discarded by the reminding mechanism as indicated by the block 53. After all requests, the cursor is checked to see if this is the last stop in the action path at decision point 54, and if so the trailer actions are performed as indicated in block 55 and the flow chart A2, FIG. 9. If this is not the last action path, then the cursor is reset to make the next stop the current one, indicated by the block 56, and control passes to the notification and delivery mechanisms 57 seen in flow chart A3, FIG. 10. First, the presence of a handle to the prinobject is checked at decision point 58 of FIG. 10, and if not the functional translation operation at block 59 is called (flow chart B, FIG. 11). If the handle is present, the notify function 60 is invoked (flow chart C, FIG. 12). A decision point 61 checks to see if the call succeeded (i.e., if principal object was reachable), and if not a retry is enqueued as indicated by block 62. If the call succeeded and a reply is received, then decision point 63 checks to see if the notify was accepted, and if so the delivery mechanism is called at block 64 (flow chart D, FIG. 13). After delivery, a nagging request may be enqueued, if any, before return. If the notify call is rejected at 63, and a substitute principal found to be named at point 65, then an action stop 28 for the new principal is added to the action path object and this new stop is made current, as indicated by block 66. The handle for the new prinobject is obtained at block 67 and control is returned to point F to invoke notify of the substitute principal.

Figure 9:
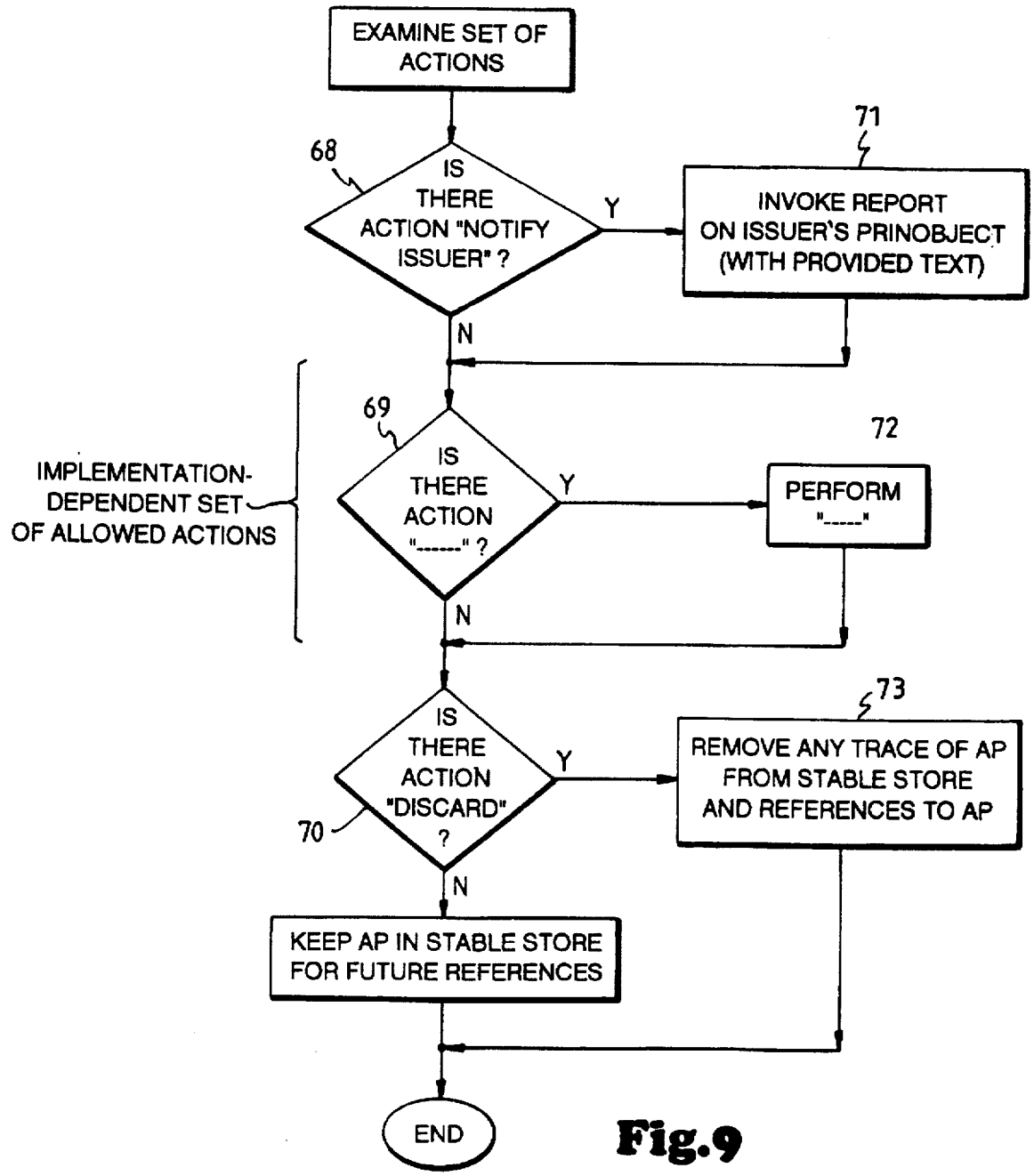
FIG. 9 is a more detailed logic flow chart of the step of performing the action path trailer in the method of FIG. 7.

If the action stop is the last one in the action path, and the trailer is invoked at block 55 of FIG. 7, the flow of FIG. 9 controls. Each of the set of possible actions is checked to see if present by a series of decision points 68, 69 and 70, and for any that are indicated the action is performed at blocks 71, 72 and 73. If there is no "discard", the action path is left in stable store, but if so, all traces are removed.

Referring to FIG. 11, the functional translation can be performed on all action stops or on just one, as decided at point 69; if for all then the flow of FIG. 11 is repeated for each action stop as indicated by the block 70. At decision point 71 it is determined whether the principal name is in the action stop, and if not the name is recovered from the information base as indicated by block 72. When a reply is received, it is tested to see if it is a single name at point 73, and if not then the group is expanded to obtain each member of the group then each name is recovered. After the single or multiple names are obtained, control returns to the path 74 to check at point 75 on whether the handle for the principal's prinobject is in the action path, and if not the handle is fetched from the object supervisor at block 76.

The notification function is illustrated in FIG. 12. First, it is determined at point 77 whether the prinobject has a profile of preferred notification methods, and if not the default notification method is implemented at block 78. If so, a decision tree including points 79, 80 and 81 is entered to check whether there is an entry for Role and ApplId (the application selector), after which the entry is executed and checked to see if the routed object is accepted at point 82. If entry indicates that the object should not be accepted then there is a return with substitute principal, if any. If accepted, then the notification method is performed as indicated by the block 83.

In FIG. 13, the flow chart for the delivery mechanism is shown. A migration policy is consulted and the migration hint in the action path object is compared at decision point 84; if no migration is recommended then control returns, but if migration is recommended the supervisor's migration mechanism is called at block 85. Indicated in block 86, the object is migrated also in stable store if this action is recommended by the policy.

Figure 8:
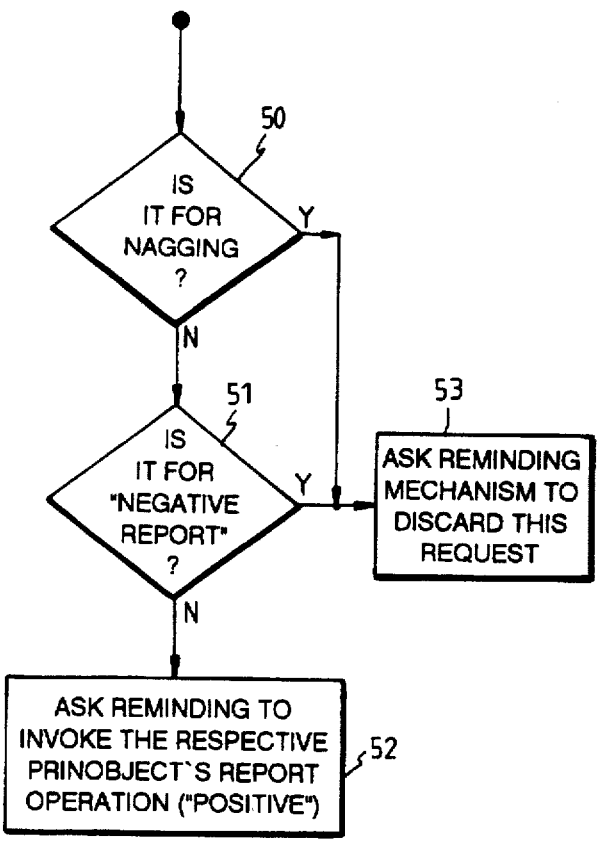
FIG. 8 is a more detailed logic flow chart of the reminding step of dispatch in the method of FIG. 7.

The Alert and DispatchBack functions mentioned above are shown in flow chart form in FIGS. 14 and 15. For alert, the action path object for routed object h is obtained and checked for correct action path at blocks 87 and 88, then Notify Exception (Table 2) is invoked at block 89. There is a check at 90 to see if the call succeeded, and if not a retry is enqueued at block 91. The DispatchBack mechanism of FIG. 15 is the same as the dispatch mechanism of FIG. 7 up to block 92a which handles requests associated with the current action stop (FIG. 8). Then a decision point 92b checks to see if a substitute principal is named; if so a new action stop is added to the action path for this substitute principal at 93, a handle is obtained, and entry point F of FIG. 10 is entered. If not, a back-up is implemented; the former action stop is set to be current, at point 94, Notify Exception is invoked with "direction" set to backward at point 95, then a check to see if the call succeeded is made at 96. If the call did not succeed, then a retry is enqueued at 97.

An example embodiment of the object routing system of the invention is implemented within a distributed system which was described in the Black & Artsy publication mentioned above. That publication described a framework for constructing highly distributed applications. The example system consists of logical nodes 10–13 of FIGS. 1 or 2 running at the user level, and supporting object-oriented programming and providing services for LII, object mobility, and object persistence. An object supervisor resides at each node to provide these services. The system is implemented in Modula2+ which provides integrated RPC and multithreading services. The Modula-2+ system is described by P. Rovner, "Extending Modula-2 to build large, integrated Systems," IEEE Software 3:6 (November 1986), pp. 46–57.

An example embodiment may be implemented to process mileage vouchers within a corporation, where the application consists of Form, Folder, Principal, and Memo object types. This is similar in flavor to the example application discussed above for processing expense statements. An employee sitting at a terminal can use a graphic, window-based user interface to pop up a voucher template, fill it in, and submit it to the system. The application assigns an action path to the voucher object, transparently to the user. Typically, the action path would include the employee, the manager of his or her cost center, the cashier responsible for that cost center, and an archive. Depending on the amount and the nature of the expense, the voucher may need the approval of additional managers, and the path would get longer. Employees, managers, cashiers, and the archive would typically be in a close proximity to each other (same LAN), but in some cases they may be a few or thousands of miles apart. In this example application, employees, managers, cashiers, and archives are principals, represented by prinobjects. Cashiers and archives, however, are automated, and hence they use different interaction styles.

This example object routing system includes a subset of the features described herein, and supports all the default options. The application provides a procedure to create an action path when a voucher object is submitted to the system. The procedure specifies a list of principals (by organizational roles) to act on the voucher, which is similar to the one for Ann's voucher in the expense reimbursement example described above. A name service is used to store the information base; this base includes principal names and their organizational association, and for each organizational unit in the prototype, a list of its members, manager, and a few other functionaries. The Functional Translation mechanism uses this name service to find the principals' names, gets handles of their objects via the supervisor, and adds them to the appropriate stops in the Action Path.

To dispatch a voucher, a human user (employee or manager) clicks a Dispatch icon on his or her workstation screen, and the user interface calls Dispatch with the appropriate parameters; the prinobject of the automated cashier or archive calls Dispatch directly. The default method of notification for human principals is to insert the routed object handle into the "inbox" folder of the principal with the subject of the path. The user interface for human users polls this folder periodically; if it discovers a new object there, it indicates this fact to the user via a blinking icon. Users can open their folders at their convenience, see the subject of the objects awaiting their action, and choose the one they want to handle by pointing at it. The Notify operation for the automated cashier, however, directly calls its verify operation to examine the voucher's contents and validate the signatures (and issues the check, of course); the Notify operation of the archive's prinobject simply files the voucher and immediately redispatches it. The migration hint in this example application is always yes, and the default policy is to migrate the routed object to the current principal's location. Folder objects are used to route multiple objects on a single path.

In other embodiments, the concepts of the invention may be employed in systems having various extended functions. For example, transaction processing may employ these concepts. A business transaction often has a well-defined logical path to traverse, such as a predefined list of accounting or banking clerks. Action paths can be used for this purpose, with the routed object being the "subject" of the transaction (e.g., a money transfer form), or a transaction script that is performed at each stop. Transaction processing, however, requires some additional services such as aborting a transaction or undoing certain operations. To extend the routing system to include such additional services, there may be added to the routing system the unique services necessary for transaction processing, or transaction processing semantics may be incorporated into the routing system. For example, one way to integrate the two systems is to view the actions at each action stop as a subtransaction, where the entire path is a nested transaction; the routing system would allow changing the path according to the requirements of commit, abort, undo, or redo operations on the routed object. Alternatively, each action stop can be tagged with a log label, and Dispatch would log or commit the changes at each action stop. Should the routed object be DispatchBacked to that stop, the routing system can automatically or on demand roll the routed object's state back to the labeled log record.

The invention may need to be modified slightly to accommodate complete "garbage collection" in a distributed system. An action path should usually disappear once the routed object (O) completes the route, but some applications may want to retain it for later audit. In some cases disposing of an APO can be easily achieved, if the application is careful to detach the APO from O at the end of the route, and either explicitly disposes of APO or lets an automatic garbage collection mechanism reclaim it. In other cases, however, reclaiming APO may be difficult since multiple prinobjects may still have references to APO. Some application hints are needed to improve the ability to collect "orphan" APOs despite existing references to them. In the example embodiment above prinobjects are given handles to the routed object, so usually only O has a reference to its APO, which is easily dropped at the end of the route.

Another area where modification may be needed is in supplying complete protected mutability. In the above discussion only the dispatching mechanism is allowed to extend a path based on functional translation, and the current principal provides a substitute. Otherwise, it does not allow users to change the graph of action stops. But in some applications users may be allowed or even requested to modify action paths. An example where such a feature could be useful is when a memo is sent to an initial group of people, each of whom is asked to name others that might be interested in viewing the memo (and add them to the path in some order), and so forth. This can be accomplished (but less elegantly) by putting copies of the memo in folders and using ad-hoc paths. Letting users specify extensions or modify the graph is useful at some situations, but raises problems of graph complexity (the path can become tremendously complex), path consistency (different users in a parallel path may suggest conflicting branches), and may require a complex user interface to express all possible changes. It also raises the question of how to verify that the changes are permitted by the application. Furthermore, certain applications may demand more restrictive use of the operations on a path, including getting reports of events or copying the path. In either way, routing semantics could be introduced into applications, or application semantics into the object routing system, but both such approaches are undesirable. One way to extend the object routing system is to associate capabilities or access control lists with action paths, or indeed even with each stop, and use the authentication service to protect against unauthorized modification. Such lists would have application-specific semantics, but the protection mechanism can be application-independent. Such an extension would increase the complexity of the routing system.

It is seen that there has been described herein a comprehensive object routing system which can be used for routing objects of various kinds, such as mail messages, structured data types, or files. Although this object routing system includes several features for the convenience of human users (e.g., using text descriptions, reminding, and selective notification), the target principals of routing can be also automated tools—as illustrated by the example implementations. What distinguishes the object routing system described herein from prior systems is the use of available mechanisms as mentioned above, upgraded with some unique features, to provide a generic, application-independent distributed systems service. Although certain restrictions are imposed on path evaluation and modification, powerful and flexible tools are provided to control and monitor the progress of the routed object, to handle routing problems, and to let principals select the methods of notification when certain events need their attention. Building the routing system as a service layer above an object-support service makes this system simple to use, uniform, and powerful. By way of summary, the major benefits of this system that derive from its "object-orientedness" are as follows:

(1) Protection. Encapsulating the action path in an object provides information hiding and protection of the path's state. Conversely, if in a mail system the path is an integral part of a mail message, its internal state may be neither hidden nor protected from the user.

(2) Invocation uniformity. Operations on the path are invoked in the same way as operations on the routed object and operations on the target principals.

(3) Interface uniformity. Since the targets of routing are objects, indistinguishable from the routing system's view whether they are humans or automated tools, the system can use the same method to communicate with them. This simplifies notification and reminding.

(4) Communication and traceability. The underlying location-independent interobject communication mechanism simplifies the design of the object routing system: principals can be notified regardless of where they are, and paths can be inspected by principals regardless of their current location. This feature provides the important benefit of having the ability to control the progress of the object along its action path. In contrast, in a message routing system such traceability can be achieved by viewing messages as objects and using similar services to those of the invention, or using a message database. Using a centralized database limits the scalability of the system, whereas using a distributed database would incur high communication costs to maintain consistency.

(5) Sharing and parallelism. Path sharing and parallel routing are easier in an object-oriented system. In contrast, in a message-based system it is hard to share the same path (including its updates) by multiple messages, and it is similarly hard to allow multiple principals to simultaneously access a single message (not its copies).

(6) Efficient interaction. Object migration allows co-locating the routed object with the next principal on the action path. In contrast, routing logical entities that are stored in a database does not have this benefit, unless they "migrate" to the interacting node, or the database is partitioned, with a local partition residing at every node.

(7) Addressing simplicity. In a message-based or mail-based routing the system has to translate names to network-wide addresses, which may change and hence introduce errors. In this system, names are translated to object handles, which can be viewed as fixed logical addresses. Although the object supervisor still has to find the target object (and deal with stale network addresses), this is hidden from the routing system and hence makes its design easier. Of course, the complexity is pushed to the supervisor to trace mobile objects and map object handles to object locations. However, the latter has to cope with the problem anyway to support distributed object-oriented applications, so the routing system gets this simplicity almost "for free."

The description above focuses on the mechanisms that support routing rather than on the specification process; the programming tools to specify action paths may be of various types depending upon the system and programming language chosen. Some paths may be "hard-wired" in the applications; some may be created from a library of template paths; yet others may be created via graphic or text-oriented user interfaces as ad-hoc paths. Language-based tools may also allow specifying paths and having a compiler generate them, somewhat similar to the Message Management System mentioned above.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

TABLE 1

Interface Operations of the Routing Mechanisms (a) Basic Mechanisms

Dispatch (h: Handle)   Raises {NoPath};
Translate (h: Handle;. which: NextOrAll)   Raises {NoPath, TranslationFailed};

(b) Additional Mechanisms

SetReminder  (h: Handle; what: ReportKindOrNag; which: StopNum := current;
              when: Time; interval: TimeInterval; msg: Text := empty)
              Raises {NoPath, InvalidNum, InvalidTime};
CancelReminder (h: Handle; what: ReportKindOrNag; which: StopNum := current)
              Raises {NoPath, NotAllowed};
Suspend (h: Handle)   Raises {NoPath};
Resume (h: Handle)    Raises {NoPath, MultiplePaths};
Copy (h: Handle) : Handle   Raises {NoPath};
Transfer (src, dst: Handle)   Raises {NoPath, MultiplePaths};
SetParallel (h: Handle; dir: InOrOut; f: Function; arg: Int2; which: StopNum := current)
              Raises {NoPath, InvalidNum};
DispatchBack (h: Handle; reason: Text := empty; substitute: PrincipalName := none)   Raises {NoPath}
Alert (h: Handle; reason: Text)   Raises {NoPath};

TABLE 2

Object Operations Upcalled by the Routing System (a) Basic Mechanisms prinObject.Notify (robj: Handle; role: Role; id: AppIID; subject: Text;
      mh: MigrationHint:=yes; OUT substitute: PrincipalName; OUT rejectionReason: Text):
      Accept or Reject (b) Additional Mechanisms prinObject.Report (robj: Handle; role: Role; id: AppIId; subject: Text; which: StopNum;
      dir: PosorNeg);
      prinobject.Nag (robj: Handle; role: Role; id: AppIId; subject: Text; who: PrincipalName)
      prinObject.NotifyException (robj: Handle; role: Role; id: AppId; reason: Text;
      dir: Direction :=backward);
par-in Function (which: StopNum; which Dispatched: StopNum count: Int32; arg:
      Int32) : Boolean;
par-out Function (which: StopNum; arg: Int32): Set of StopNum;

What is claimed is:

1. A method of routing an object in a distributed computing system, said distributed computing system having a number of nodes, each node being a processor able to execute processes, said each node having at least one principal associated therewith, the nodes communicating with one another by a network, said method comprising the steps of:

(a) creating by one of said nodes in said computing system a data structure forming a routed object and creating by said one of said nodes in said computing system another data structure forming an action path object attached to said routed object, the data structure forming said action path object defining a sequence of action stops for the routed object, said action stops naming other ones of said nodes in said data structure forming said action path object, said data structure forming said routed object being accessible by a process executing on each one of said other nodes, said data structure forming said action path object describing for each of said action stops a name or functional description of one of said principals associated with one of said other nodes;

(b) dispatching said data structure forming said routed object by said one of said nodes in said computing system via said network to one of said action stops at one of said other nodes in said sequence of action stops;

(e) receiving at said one of said other nodes of said computing system said data structure forming said routed object and said data structure forming said action path object attached to said routed object;

(d) performing an action, at said one of said other nodes, on said data structure forming said routed object, said action including modifying at least part of said data structure, and when done, indicating so by requesting dispatch of said data structure forming said routed object and said data structure forming said action path object attached to said data structure forming said routed object, by said computing system, to another one of said other nodes; and (e) dispatching said data structure forming said routed object by said one of said other nodes of said computing system to said another one of said nodes associated with an action stop of said sequence;

wherein the method includes routing said routed object to at least two action stops in parallel, and wherein the method includes inspecting a migration hint in said action path object, and if the migration hint recommends no migration, then not performing migration of said routed object, and if the migration hint recommends migration, then following a migration policy for migrating said routed object.

2. A method according to claim 1, further including a step of performing a functional translation to find a name of a principal from a functional description of an organization structure or role designated for at least one action stop in said sequence of action stops, and notifying said principal when said routed object is routed to said at least one action stop in said sequence of action stops.

3. A method according to claim 1, which includes identifying said action stops by handles of principal objects for particular ones of said nodes, and storing, by one of said nodes, in said action path object, notification/routing information for a principal described in a next one of said action stops in said sequence, said notification/routing information defining a method for said principal to be notified or to have a routed object be forwarded to a different principal.

4. A method according to claim 1, including the step of attaching the routed object to a folder object, and attaching additional objects to the folder object, and attaching the action path object to the folder object, and including the step of muting the routed object, the folder object, said additional objects, and the action path object attached together as one unit.

5. A system for handling a routed object in a distributed computing network, said system having a plurality of nodes, each node including a digital processor, said routed object having an action path object attached thereto, the action path object defining a sequence of action stops for the routed object, said action path object also defining a name or functional description of a principal associated with one of said nodes; said system comprising:

(a) said digital processor at said one of said nodes including means for providing basic services, said means for providing basic services including means for memory management and means for internodal communication;

(b) said digital processor at said one of said nodes including an object supervisor means for supporting object-oriented applications, said object-oriented applications including applications composed of objects that are dispersed over multiple ones of said nodes and objects that are shared among the applications, said object supervisor means including means for creating objects, means for managing object migration and persistence, and means for managing interobject communication;

(c) said digital processor at said one of said nodes including routing means for routing objects between said nodes, said routing means being supported by said basic services and services of said object supervisor means, said routing means including (i) means for receiving said routed object and said action path object attached to said routed object, said one of said nodes being associated with one of said action stops in said sequence of action stops;

(ii) means for performing an action on said routed object by said principal associated with said one of said nodes, and when done, indicating so by generating a dispatch request;

(iii) means for dispatching said routed object by said network to another one of said nodes associated with one of said principals identified in another action stop of said sequence;

(iv) means for accessing said action path object for data identifying the name or functional description of said principal and using the data identifying the name or functional description of said principal to notify said principal that said routed object needs the principal's attention;

(v) means for reminding said principal of said action if said action is not performed within a selected time period; and (vi) means for monitoring said routed object including means for detecting whether said one of said nodes has finished said action and reporting to other principals if said one of said nodes has not finished said action, and means to report to other principals when said routed object is dispatched.

6. A system according to claim 5, wherein said routing means includes means for interpreting an action stop logical representation including: a specification of a principal including an organization role, a name, or an object handle; a migration hint for indicating whether or not the routing means is to follow a migration policy; information specifying whether or not a principal is to be reminded to act on said routed object; information specifying whether or not action on said routed object is to be reported backwards in said sequence of action stops; information specifying a period of time until a principal is to be reminded to act on said routed object; information indicating how said routed object is to be routed over parallel paths of said sequence of action stops; information indicating whether or not a principal of a next action stop in said sequence of action stops is to be substituted for the principal said one of said nodes; and information indicating next and previous action stops in said sequence of action stops.

7. A system according to claim 5, wherein said means for dispatching does not include any means for checking the routed object to ascertain whether or not control of the routed object should be transferred to a principal of a next action stop in said sequence of action stops so that dispatching of the routed object is free of semantics of any particular application.

8. A system according to claim 5, wherein said object supervisor means does not include means for object replication, and wherein said routing means includes means for preventing migration of the routed object to multiple next action stops.

9. A system according to claim 5, wherein said means for dispatching includes means for inspecting a migration hint in said action path object, and if the migration hint recommends no migration, then not performing migration of said routed object, and if the migration hint recommends migration, then following a migration policy for migrating said routed object.

10. A system according to claim 5, wherein said routing means includes means for routing exceptions forwards and backwards to action stops in said sequence of action stops, and means for receiving routed exceptions and notifying said principal of the received routed exceptions.

11. A system according to claim 5, wherein said routing means includes means for performing a functional translation to translate an organization role to a name for said principal.

12. A system for handling a routed object in a distributed computing network, said system having a plurality of nodes, each node including a digital processor, said routed object having an action path object attached thereto, the action path object defining a sequence of action stops for the routed object, said action path object also defining a functional description of an organization structure or role of a principal associated with one of said nodes; said system comprising:

(a) said digital processor at said one of said nodes including means for providing basic services, said means for providing basic services including means for memory management and means for internodal communication;

(b) said digital processor at said one of said nodes including an object supervisor means for supporting object-oriented applications, said object-oriented applications including applications composed of objects that are dispersed over multiple ones of said nodes and objects that are shared among the applications, said object supervisor means including means for creating objects, means for managing object migration and persistence, and means for managing interobject communication;

(c) said digital processor at said one of said nodes including routing means for routing objects between said nodes, said routing means being supported by said basic services and services of said object supervisor means, said routing means including (i) receiving means for receiving said routed object and said action path object attached to said routed object, said one of said nodes being associated with one of said action stops in said sequence of action stops;

(ii) functional translation means for finding a name of said principal from said functional description of an organization structure or role associated with said one of said nodes;

(iii) notification means for notifying said principal when said routed object needs attention of said principal;

(iv) means for reminding a principal of said requested action if said requested action is not performed within a selected time period;

(v) action means for performing an action on said routed object by said principal, and when done, indicating so by generating a dispatch request; and (vi) delivery means for performing a logical or physical move of said routed object to a next action stop in said sequence of action stops.

13. A system according to claim 12, which further includes (vii) means for monitoring said routed object including means for detecting whether said one of said nodes has finished said action and reporting to other principals if said one of said nodes has not finished said action, and means to report to other principals when said routed object is dispatched.

14. A system according to claim 12, wherein said routing means includes means for interpreting an action stop logical representation including: a specification of a principal including an organization role, a name, or an object handle; a migration hint for indicating whether or not the routing means is to follow a migration policy; information specifying whether or not a principal is to be reminded to act on said routed object; information specifying whether or not action on said routed object is to be reported backwards in said sequence of action stops; information specifying a period of time until a principal is to be reminded to act on said routed object; information indicating how said routed object is to be routed over parallel paths of said sequence of action stops; information indicating whether or not a principal of a next action stop in said sequence of action stops is to be substituted for the principal of said one of said nodes; and information indicating next and previous action stops in said sequence of action stops.

15. A system according to claim 12, which does not include any means for checking the routed object to ascertain whether or not control of the routed object should be transferred to a principal of a next action stop in said sequence of action stops so that dispatching of the routed object is free of semantics of any particular application.

16. A system according to claim 12 wherein said delivery means includes means for performing parallel routing of the routed object to a plurality of next action stops, said means for performing parallel routing including means for parallel routing of the routed object to all of said plurality of next action stops absent a contrary indication from an application at said one of said nodes, and when a contrary indication from an application at said one of said nodes is present, for performing parallel routing as indicated by said application.

17. A system according to claim 12, wherein said object supervisor means does not include means for object replication, and wherein said routing means includes means for preventing migration of the routed object to multiple next stops.

18. A system according to claim 12, wherein said means for dispatching includes means for consulting a migration hint in said action path object, and if the migration hint recommends no migration, then not performing migration of the routed object, and if the migration hint recommends migration, then following a migration policy for migrating the routed object.

19. A system according to claim 12, wherein said routing means includes means for routing exceptions forwards and backwards to action stops in said sequence of action stops, and means for receiving routed exceptions and notifying said principal of the received routed exceptions.

* * * * *